US00RE36596E

United States Patent [19]

Schneider

[11] E Patent Number: Re. 36,596

[45] Reissued Date of Patent: Mar. 7, 2000

[54] FILING FOLDER TAB HAVING READABLE INFORMATION

[75] Inventor: Eric D. Schneider, Plymouth, Minn.

[73] Assignee: Wild File, Inc., Plymouth, Minn.

[21] Appl. No.: 08/877,638

[22] Filed: Jun. 20, 1997

Related U.S. Patent Documents

Reissue of:

[64] Patent No.: 5,513,459
Issued: May 7, 1996
Appl. No.: 08/517,078
Filed: Aug. 21, 1995

U.S. Applications:

[60] Continuation of application No. 08/372,969, Jan. 17, 1995, abandoned, which is a division of application No. 08/237, 266, May 3, 1994, Pat. No. 5,455,410.

[51] Int. Cl.[7] ..... G09F 23/10

[52] U.S. Cl. ..... 40/641; 40/359

[58] Field of Search ..... 235/385, 462, 235/486; 40/641, 359

[56] References Cited

U.S. PATENT DOCUMENTS

| | | | |
|---|---|---|---|
| 3,543,007 | 11/1970 | Brinker et al. . | |
| 4,204,639 | 5/1980 | Barber et al. | 40/641 X |
| 4,219,296 | 8/1980 | Fujii et al. | 414/273 |
| 4,240,848 | 12/1980 | Barber . | |
| 4,457,016 | 6/1984 | Pfeffer . | |
| 4,567,361 | 1/1986 | Rosenthal . | |
| 4,582,987 | 4/1986 | Bianco | 40/641 X |
| 4,636,634 | 1/1987 | Harper et al. . | |
| 4,687,912 | 8/1987 | Ohta . | |
| 4,704,517 | 11/1987 | Campisi et al. | 235/382 |
| 4,866,255 | 9/1989 | Sing | 235/385 |
| 4,973,086 | 11/1990 | Donnelly et al. . | |
| 5,038,023 | 8/1991 | Saliga . | |
| 5,083,816 | 1/1992 | Folga et al. . | |
| 5,287,414 | 2/1994 | Foster | 235/385 X |

FOREIGN PATENT DOCUMENTS

| | | |
|---|---|---|
| 0361989 | 4/1990 | European Pat. Off. . |
| 56-110193 | 9/1981 | Japan . |
| 2185497 | 7/1990 | Japan . |
| 4268994 | 9/1992 | Japan . |

OTHER PUBLICATIONS

"The Bar Code Book" by Roger C. Palmer (cover and Table of Contents pages only) month &ear missing.
2 page Excerpt from Atlanta Catalog "Missing Author, Title, Date, Pertinent pgs, etc".
Sample of Atlantic Tab A5843–60 "Missing Author, Date".

*Primary Examiner*—Donald T. Hajec
*Assistant Examiner*—Michael G. Lee
*Attorney, Agent, or Firm*—Vidas, Arrett & Steinkraus, P.A.

[57] ABSTRACT

A filing system is provided for locating a particular file contained in a file holder which contains a plurality of files. The apparatus includes a machine-readable code mounted on each of the files, a guide attached to each file holder, a scanner for reading the codes on the files in a file holder, and an indicator for indicating when the particular machine-readable code corresponding to the particular file is located. The apparatus uses an improved bar code in which character boundaries are eliminated and the number of ONE's and ZERO's in a code are variable, resulting in increased data density. The unique numeric values which result from the improved bar code sparsely populate the possible range of values, and therefore a mapping algorithm is provided to map the bar code values to a sequential numeric system for ease of use. The improved bar code system uses repeating basic patterns of bars separated by a MARK bar, and a basic pattern can be reconstructed if the scan view includes only one MARK bar surrounded by ONE and ZERO bars. The improved apparatus also utilizes an inventive perpendicular file tab which positions the bar code accurately for the scanner. Border bars are provided to allow the scanner to separate bar codes from each other and to aid in determining if a bar code is defective or damaged.

7 Claims, 23 Drawing Sheets

FILING FOLDER TAB HAVING READABLE INFORMATION

Matter enclosed in heavy brackets [ ] appears in the original patent but forms no part of this reissue specification; matter printed in italics indicates the additions made by reissue.

CROSS-REFERENCE TO RELATED APPLICATION

This application is a FWC of the application Ser. No. 08/372,969 filed Jan. 17, 1995, now abandoned, which is a divisional or Ser. No. 08/237,266 filed May 3, 1994, now U.S. Pat. No. 5,455,410.

FIELD OF THE INVENTION

This invention relates to a scanner for locating flies and more particularly, to a file system scanner and an improved bar code which allows the system to track and locate files in a filing system.

BACKGROUND OF THE INVENTION

Many systems exist for tracking and locating files. However, most of these systems are paper based and not automated.

U.S. Pat. No. 5,287,414 to Foster, entitled "Coded File Locator System" is directed to an automated file locator system for tracking and locating files. This system utilizes bar codes contained on each hanging file folder in a filing cabinet drawer, along with a bar code scanner which is positioned at the top of the tiling cabinet and which scans each file folder in a drawer as the drawer is opened.

Foster's system uses a scanning device that is mounted to each filing cabinet so that the recording and signaling process is done "automatically" by virtue of pulling a vertical cabinet drawer in and out. However, this requires that scanning hardware be attached to every cabinet and possibly every drawer. This approach is cost prohibitive because the user faces an incremental cost as additional cabinets are added to the system, as well as the complexity in wiring the array of scanning devices (attached to each cabinet) to a central computer. Further, in the signaling process, it may be difficult for the operator to accurately locate a specific folder under the scanner given that a significantly heavy drawer full of files is being pulled out.

Applicant's invention is to put a scanning system in a hand-held battery operated device that can be conveniently run across a set of folders. The device is light and capable of monitoring the folders over which it passes at high and low speed. The operator can quickly pass the device over a drawer. If searching for a specific folder, when the device signals the folder has been found (via a light and a beep) the operator will undoubtedly have passed beyond the sought folder. Since the device is light and easy to move the operator simply backs up, moving more slowly until the device again signals.

Since there is only one required scanning device the user can add additional cabinets without significant additional cost. Further, since the device moves along a drawer, the possibility of requiring a scanning device for each drawer, as in Foster's concept, does not exist.

The following components aid in actually allowing the scanning system to perform more efficiently than existing solutions:

1) The invention of a perpendicular filing tab. This new tab provides an easy to read surface for either human or machine. This is important because the scanning process must be essentially error free in order for users to have any confidence that the system can in fact reliably track folders.

2) The invention of the EVL bar code which operates in a relatively non-aligned environment (meaning the scanner does not have to precisely pass over the bar code). On the other hand, the EVL bar code does not waste any of the scanned area—it packs information throughout the scanned area and therefore can support a large number of unique file codes (folders). Alignment is an important issue because 1) the user may not attach the filing tab to the folder in an exact and consistent location; 2) the folders will shift position on the rails on which they rest and; 3) variations in cabinet to cabinet require some degree or scanner to bar code alignment tolerance.

3) The invention of using a track on which a portable scanner rides while scanning folders in a cabinet or other folder storage system. The portability keeps the cost of the system reasonable and substantially independent of the number of folders and cabinets making up the system. The use of a track allows for easy movement of the portable scanner and controlled positioning with regard to the folders.

4) The invention of using a magnetic rolling system so that the scanner can be easily attached and removed from, for example, but not limited lo, a conventional lateral filing cabinet. This allows the scanner to operate with millions of existing lateral filing cabinets without modification of the cabinets (other than attaching cabinet and drawer numbers).

Applicant has found experimentally, that in a Foster type system, if the file is ajar or shifted from side to side that the system is unable to properly scan the entire bar code. However, in order to keep costs down, applicant would prefer to avoid having to scan the entire width of the file cabinet drawer, or depth, depending on the orientation of the files in the drawer.

The Foster system is also much more expensive to implement since it requires the installation of a scanner on each filing cabinet.

What is needed is a file scanner system which does not require the installation of a scanner on each filing cabinet, and with an improved bar code which allows for accurately reading the bar code when the file is shifted.

SUMMARY OF THE INVENTION

Applicant has invented a filing system scanner which is designed to matingly slidably fit onto a guide track to allow the scanner to be passed across the machine readable codes of all of the files or file folders in a filing drawer or bin in one quick pass.

Each file contains a machine readable code mounted on the top of the file, the code being arranged to extend longitudinally along the top edge of the file with the code being contained in a plane which is substantially perpendicular to the plane defined by the file. In the preferred embodiment the machine readable code is a bar code.

The bar code scanner is housed in an enclosure which contains a plurality of wheel and magnet assemblies which grip the metal surface of a filing cabinet drawer and properly position the scanner so that the scanner reads a predetermined area of the longitudinally extending top portion of the file or file folder. In the preferred embodiment the wheels are rubber and either have a magnetic core or have magnets mounted in close proximity to the wheels to cause the bar code scanner to grip the metal surface of the filing cabinet.

The inventive scanner is designed so that the scanner can grip the front face of a lateral filing cabinet drawer, and be guided by the top front edge of the drawer. In this instance, the files would be arranged so that the files extended perpendicular to the front of the filing cabinet drawer.

The inventive scanner can also be designed so that the scanner can grip the side of the drawer, and be guided by the top side edge of the drawer. In this instance, the files would be arranged so that the files extended parallel to the front of the filing cabinet drawer.

The scanner can also be adapted for use with wall mounted filing systems utilizing a plurality of bins for holding files, books or other materials, by the installation of a guide track which properly positions the scanner relative to the machine readable codes contained on the files, books etc.

Applicant is able to use a less expensive scanner which does not scan the entire width or depth of the filing cabinet drawer, yet still offers improved accuracy when a file is shifted slightly, since the entire scanner view contains bar code information. Applicant utilizes an improved machine readable bar code which includes repeating groups of basic patterns, each basic pattern identifying the file or file folder and separated by a MARK bar. The machine readable bar code utilizes lines or bars of three different widths to represent the ZERO, ONE, and MARK symbols contained in the machine readable code. A basic pattern is a group or set of ONE and/or ZERO bars which can uniquely identify the file or file folder. Assuming a file is shifted such that the scanner's scan does not fully encompass one entire basic pattern, the program can read the bars to the right of the MARK bar and supply the missing data from the bars to the left of the MARK bar.

Applicant's improved bar code also uses variable length encoding (Eris Variable Length or EVL bar code) to allow for greater data density in the same area.

DETAILED DESCRIPTION OF THE INVENTION

While this invention may be embodied in many different forms, there are described in detail herein specific preferred embodiments of the invention. This description is an exemplification of the principles of the invention and is not intended to limit the invention to the particular embodiments illustrated.

Figure 1:
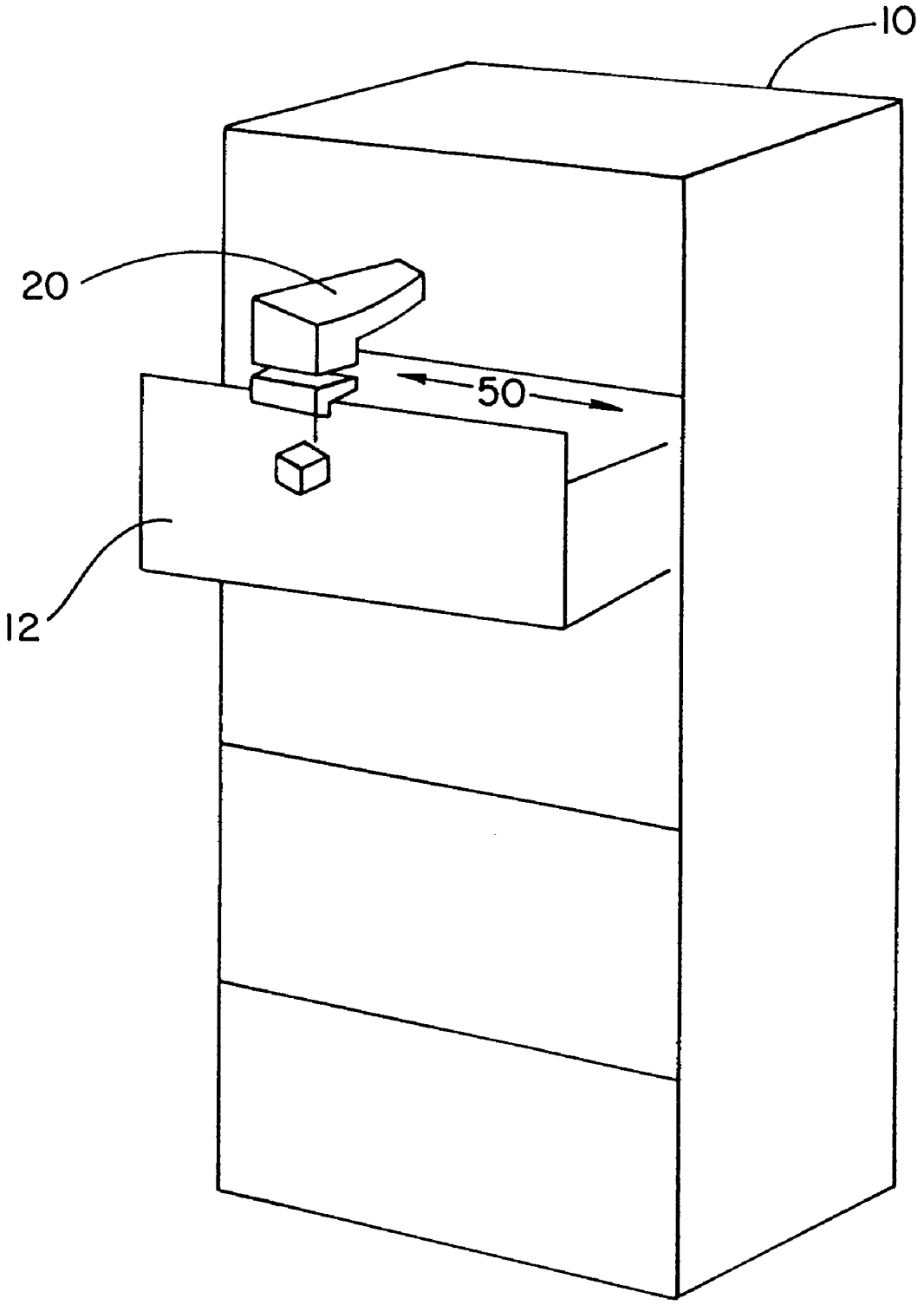
FIG. 1 is a perspective view of a filing cabinet having a plurality of file holders or lateral drawers.

Referring now to FIG. 1, a filing cabinet 10 is shown with a file holder or file drawer, shown generally at 12 partially open. File drawer 12 has front and back walls, sides and a bottom. The inventive scanner is shown on file drawer 12 at 20 and will be discussed more fully below.

The Perpendicular File Tab

Currently the tabs used with hanging folders on which to mount a label (identifying the contents of the folder) are mounted vertically or at an angle. There are problems that arise when viewing a set of folders in a file cabinet drawer dealing with the tabs (labels) blocking each other's view and the ability to read the label from an above position (standing over the drawer). Various existing solutions include angling the tabs upward and staggering their placement.

Figure 2:
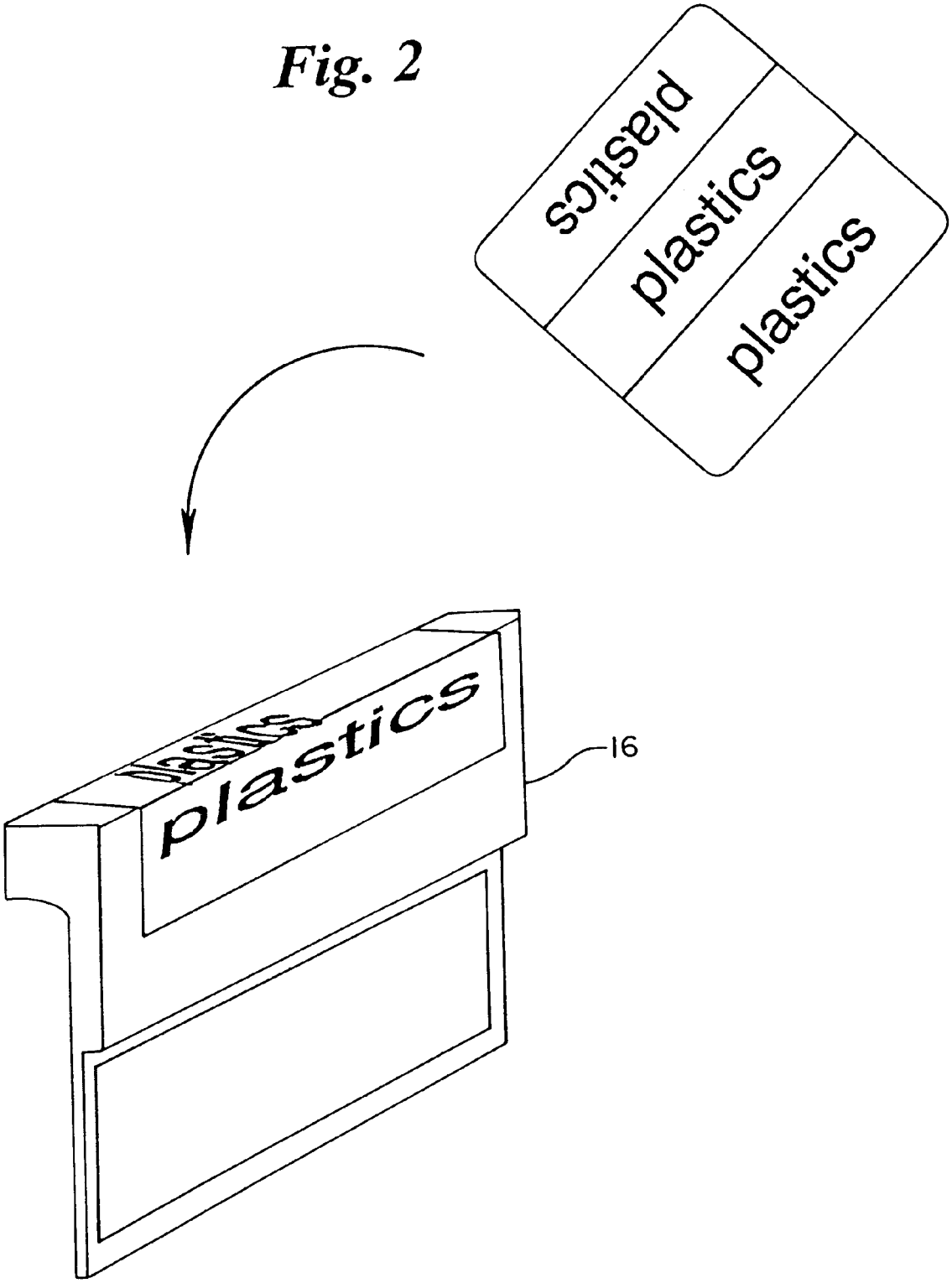
FIG. 2 shows a perspective view of the inventive perpendicular tab with an adhesive label.
Figure 6:
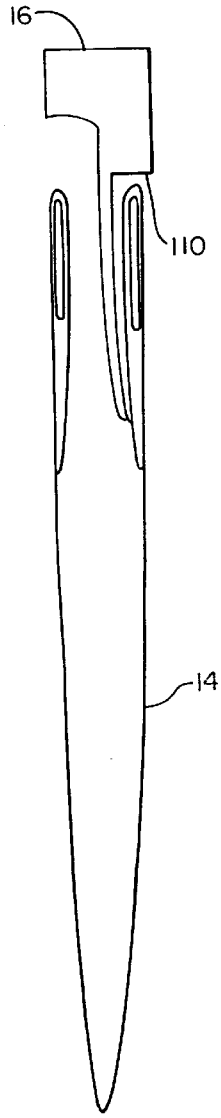
FIG. 6 shows a side view of a hanging folder and tab.

The perpendicular file tab, shown at 16 in FIG. 2, is a piece of plastic (or appropriate material) that attaches to the side of a hanging folder (or file) and provides a perpendicular, as well as vertical, surface for an identifying label. The label can contain human and/or machine readable identification. FIG. 2 also shows the location of the adhesive strip that attaches the tab to the folder as well as how a label is attached to the top and sides of the tab. Generally, the label will be produced by a computer printer and will include three copies of all or part of the identification so that the identification can be viewed from the back, top, and front of the folder. Notice that the tab has been designed so that, as much as possible, the perpendicular surface overlaps the folder, thus keeping the extra folder width introduced by the tab to a minimum. See FIG. 6.

Figure 3:
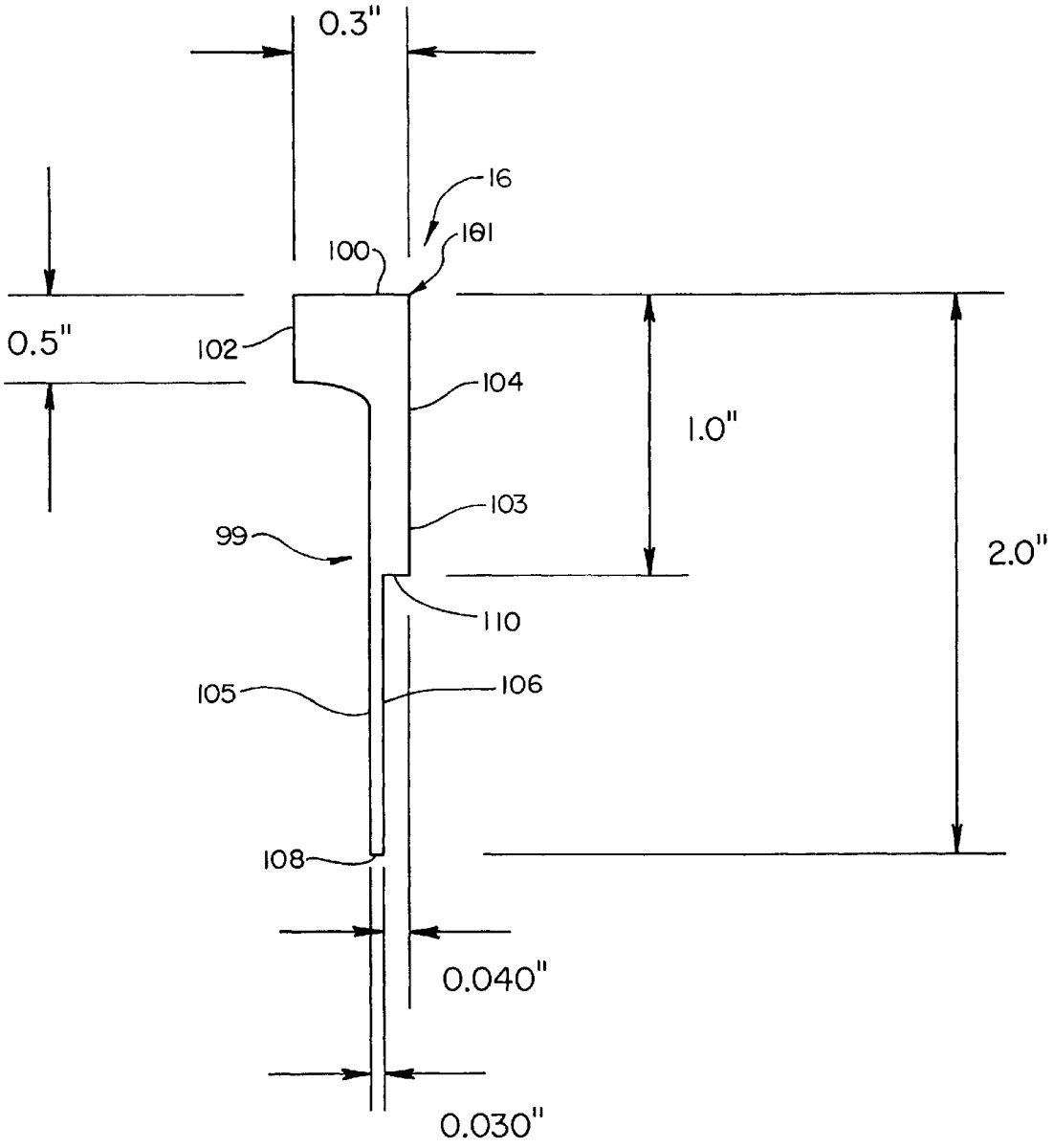
FIG. 3 shows a side view of the inventive perpendicular tab.

FIG. 3 shows the general construction and dimensions of a perpendicular file tab 16. The file tab is generally comprised of a tab support means 99, the tab support means 99 having an upper portion 103 and a lower portion 105, and a tab portion 101, the tab portion having a top surface 100 and an optional side surface 102. The preferred embodiment the tab width 100 is 0.3 inches, the tab height 102 is 0.5 inches, the upper portion of the tab support height 104 is 1 inch and the adhesive attachment section 106 located on the lower portion 105 of the tab support means is 1 inch. It can be seen that the overall height of the tab support is 2 inches. The width of the narrower tab support section 103, where the adhesive is applied for attachment to a file or file folder is 0.03 inches. The width of the cutout section 110 is 0.04 inches.

Figure 4:
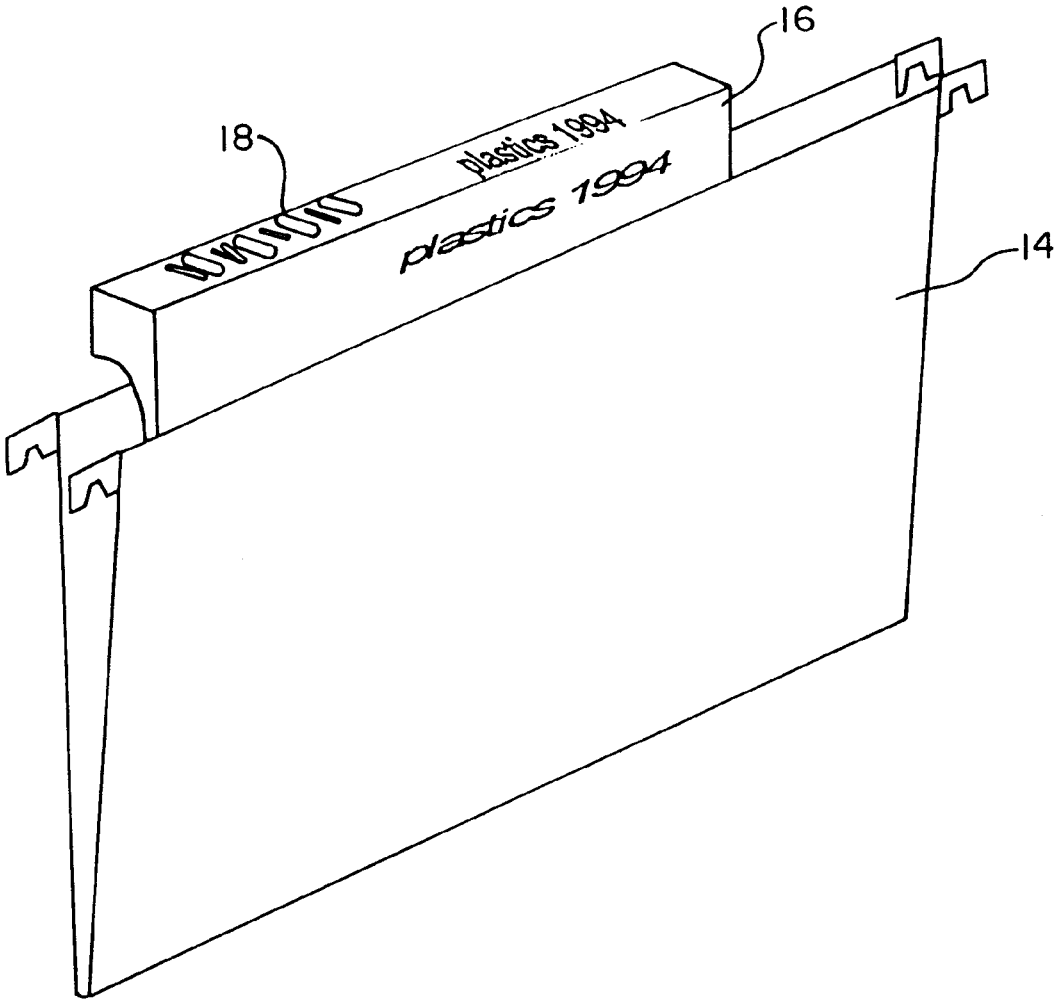
FIG. 4 is a perspective view of a file with a machine readable code mounted thereon.

Referring now to FIG. 4 a standard hanging file folder 14 is shown with an inventive perpendicular filing tab 16 and label secured therein. The perpendicular filing tab can be secured either to a hanging file folder 14 or to a file itself, and any references to files or file folders hereafter should be considered interchangeable. Carried on the top surface of the perpendicular filing tab is a machine-readable code 18, a bar code in the preferred embodiment. It should be understood that the scanner, discussed below, could read or scan any type of machine-readable code such as a magnetic stripe, optical character recognition or the like. The bar code 18 runs longitudinally along the top edge of the tab and is contained in a plane which is substantially perpendicular to the plane defined by the file folder.

Figure 5:
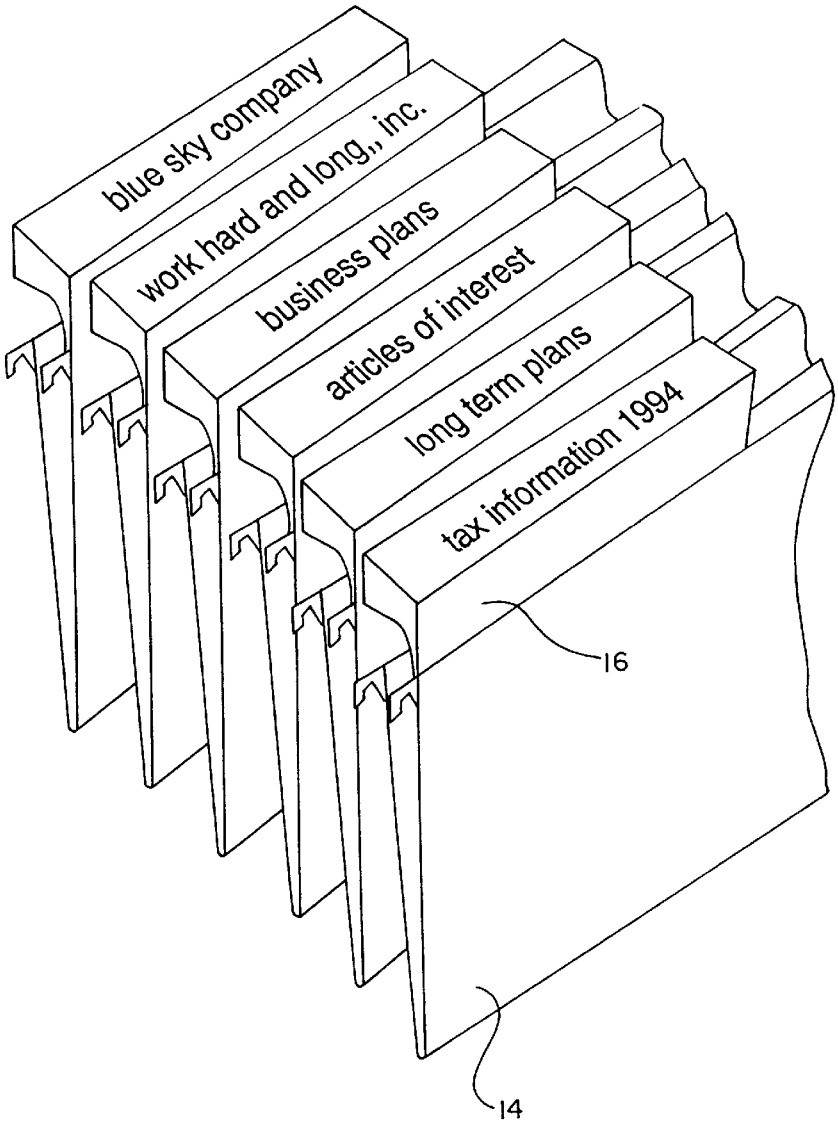
FIG. 5 shows a perspective view of a plurality of hanging file folders with tabs attached.

FIG. 5 shows a set of folders and demonstrates the improved readability when viewing from above. There is no need to stagger the location of the tabs. The width or the tab and the perpendicular label surface insure that a label is always easily readable even when folders are packed tight up against each other, best seen in FIG. 6.

Figure 7:
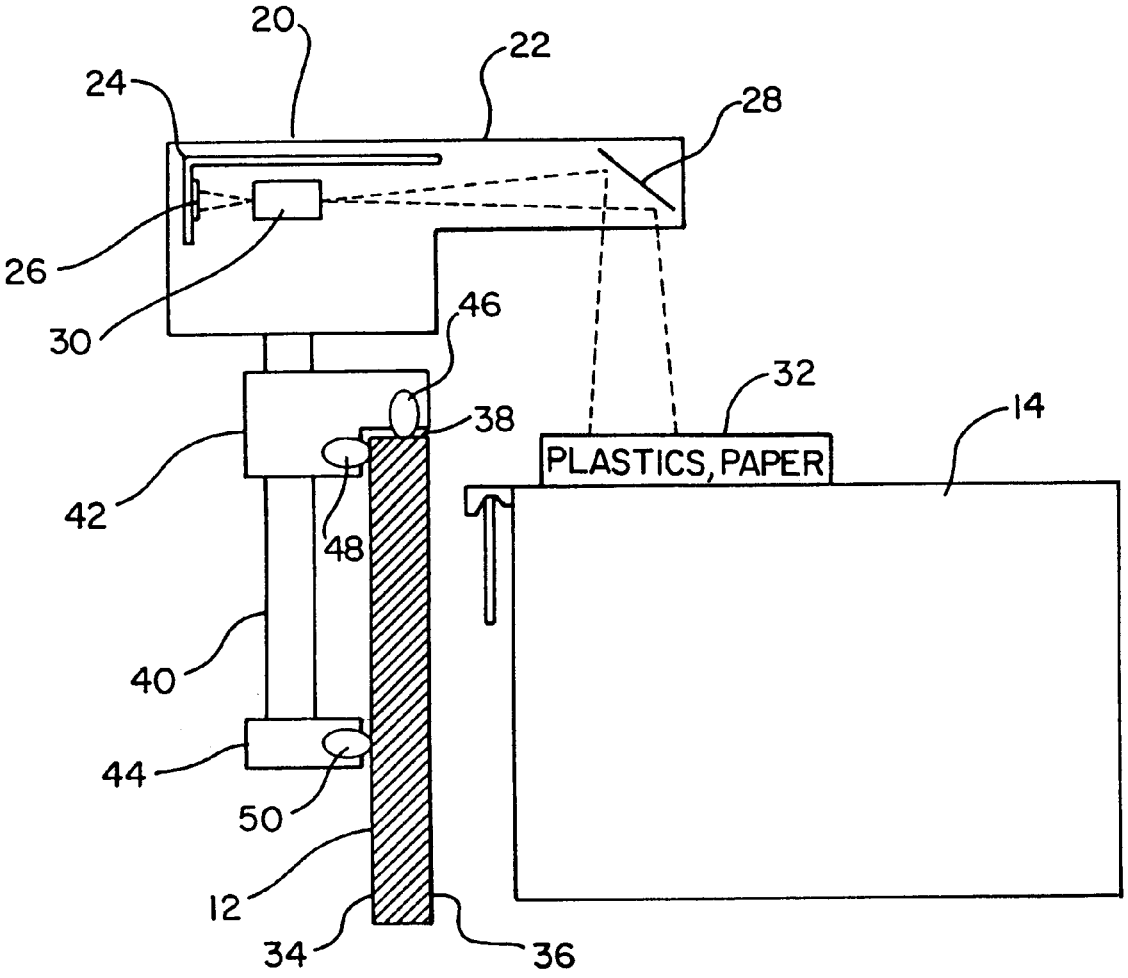
FIG. 7 is a side view of a file holder with the inventive filing system scanner mounted thereon.

Referring now to FIG. 7, the scanner, shown generally at 20 is contained in a housing 22. Inside the housing 22 is a circuit board 24 with a charge coupled device (CCD) 26 mounted thereon for processing the image of the bar code which is reflected off mirror 28 through lens 30. The use of CCD's for processing images is well known in the prior art. Lens 30 fixes the longitudinal distance scanned, shown at 32. The purpose of lens 30 is to focus the light on the CCD with sufficient depth of focus to keep the image in focus if it moves closer or further away, as is well known in the art. In the preferred embodiment the scanner uses incandescent light, and such scanners design and function are widely known to those skilled in the art. The scanner could use any type or light source, such as infrared, and these types or scanners are well known in the art.

A side view of the filing drawer 12 is shown with the side cut away. The front wall of the drawer 12 has a front side 34, a back side 36 and a top edge 38. A tubular support 40 is attached to the housing 22. Support 40 can be any desired shape. Mounted to the tubular support 40 are an upper magnetic rolling assembly and a lower magnetic rolling assembly, shown respectively at 42 and 44. It can be seen that in the preferred embodiment the upper magnetic rolling assembly 42 is shaped in an inverted L-shape. In the preferred embodiment wheels 46, 48 and 50 are rubber with a magnetic core. The wheels 46, 48 and 50 could also have magnets mounted nearby which would grip the guide. Wheels 46, 48 and 50 are carried by axles (not shown) so that the wheels roll along the top edge and front face of the front wall of drawer 12 as the scanner 20 is urged along the front wall of the drawer in the direction 50 (shown in FIG. 1). The top edge 38 and front face 34 of the drawer act as a guide so that the illuminated scanned area is positioned over a predetermined area along the longitudinal length or the files or hanging folders. The entire scanned area is filled with bar code information. However, as will be discussed further below, often the files are shifted such that an entire consecutive basic pattern is not contained within the scanned area. As those skilled in the art know, the larger the scanned area the more expensive the scanner required. The inventive file system scanner in combination with the improved bar code allows a smaller scanner to be used, which is preferred, since it provides for greater data density within a given area, along with a method of reproducing a partially scanned basic pattern.

Although the inventive filing system scanner in the preferred embodiment is designed for lateral files, using the top edge of the drawer as a guide, the device can be easily adapted for alternative embodiments.

Figure 8:
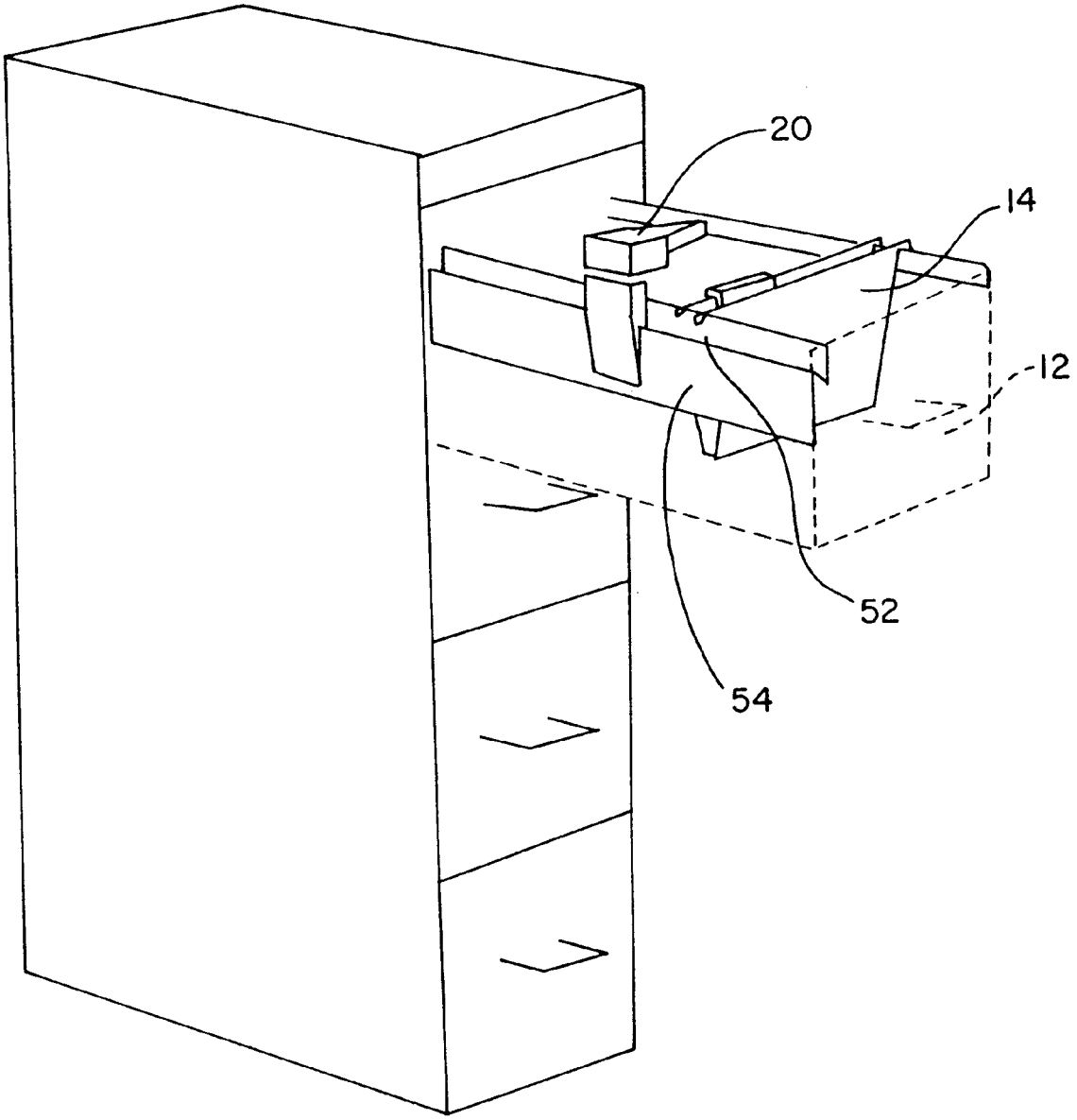
FIG. 8 is a perspective view of an alternative embodiment of the invention.

In FIG. 8 the filing drawer 12 is shown in a vertical cabinet with scanner 20 being guided by the top side edge 52 and outside face 54 of one of the sides of the drawer 12. In this embodiment the file folders 14 and files are arranged parallel to the front wall of the cabinet. In this embodiment a track may need to be installed in each drawer to provide the guide (reference numerals 52 and 54).

Figure 9:
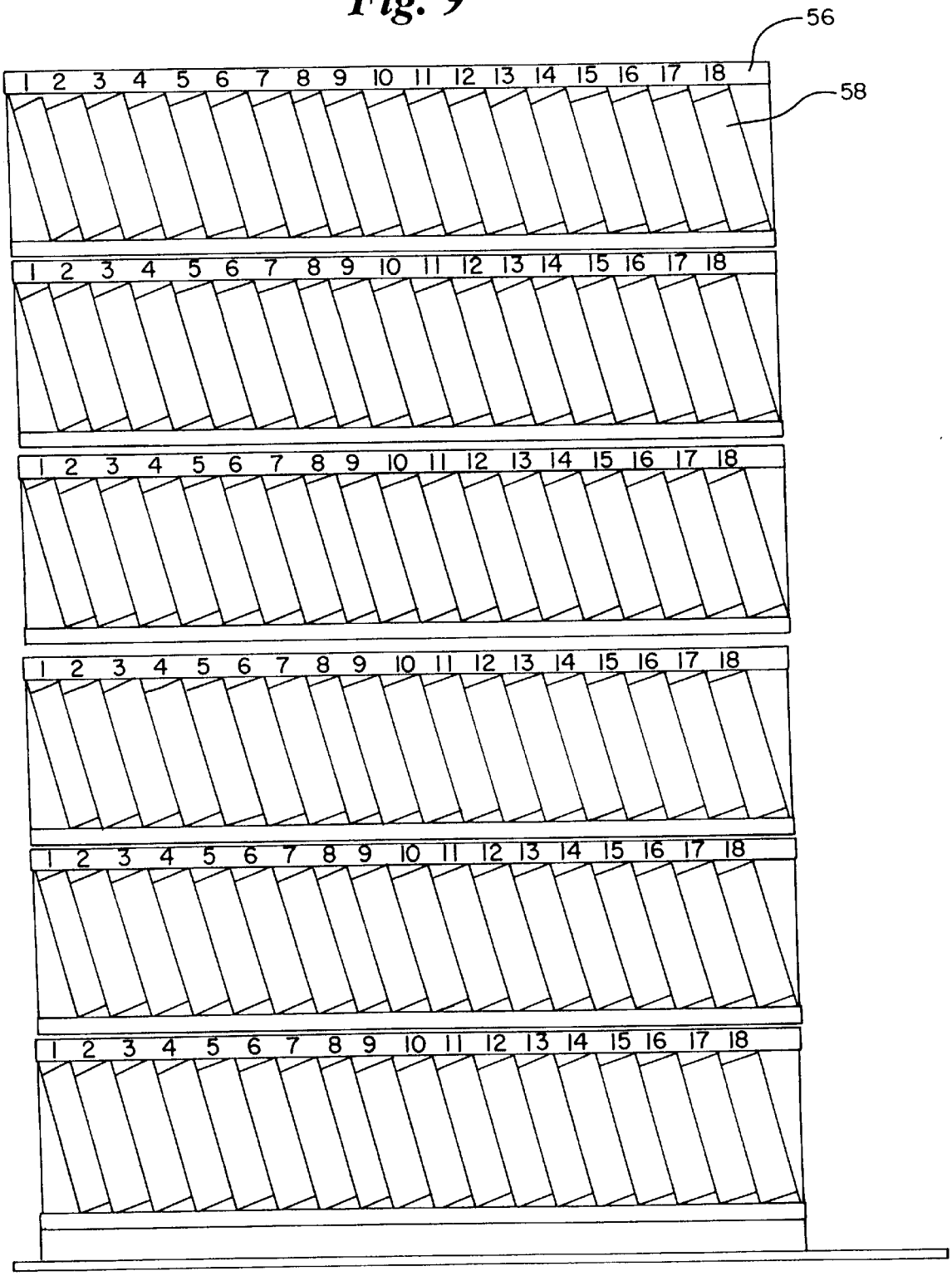
FIG. 9 is a perspective view of a wall mounted filing system.
Figure 10:
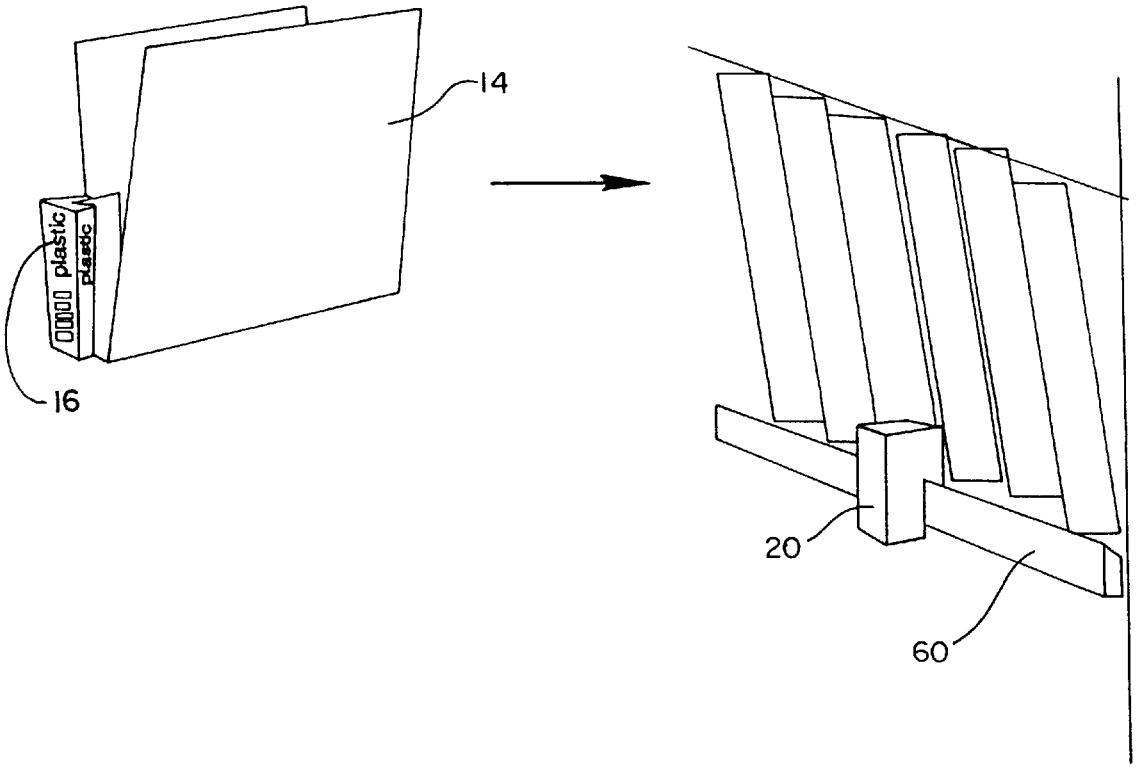
FIG. 10 is a perspective view of second alternative embodiment of the invention for use with a wall mounted filing system.
Figure 11:
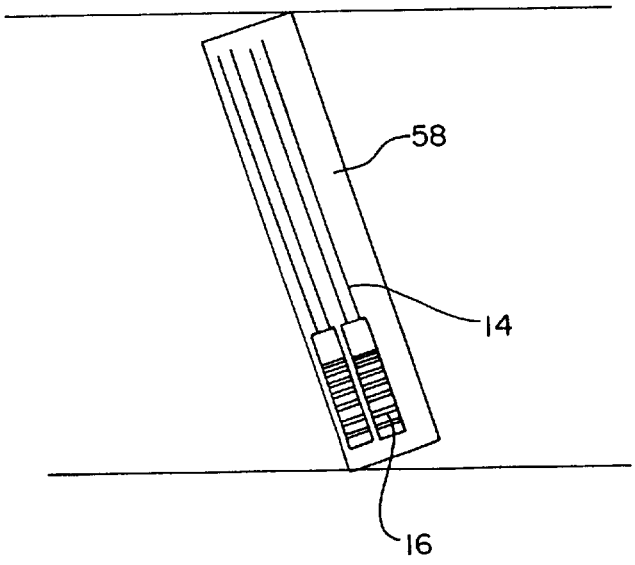
FIG. 11 is a perspective view of a slot or bin of the wall mounted filing system.

Referring now to FIGS. 9–11, a second alternative embodiment is shown in which the inventive scanner is used with a wall mounted filing system, shown generally at 56 and where the files are contained in bins 58. The scanner 20 is guided along a guide strip 60 which extends the length of the filing system. In this embodiment the bar codes are arranged perpendicular to the floor with the scanner constructed and arranged to read the bar codes without the use of mirror 28. In order to aid in controlling the permitted range of "leaning" which will affect the scan, the slots can be angled such that gravity will tend to press the side of the folder against the slide of the slot, and thus into a reasonably consistent orientation for scanning the bar code.

Figure 12:
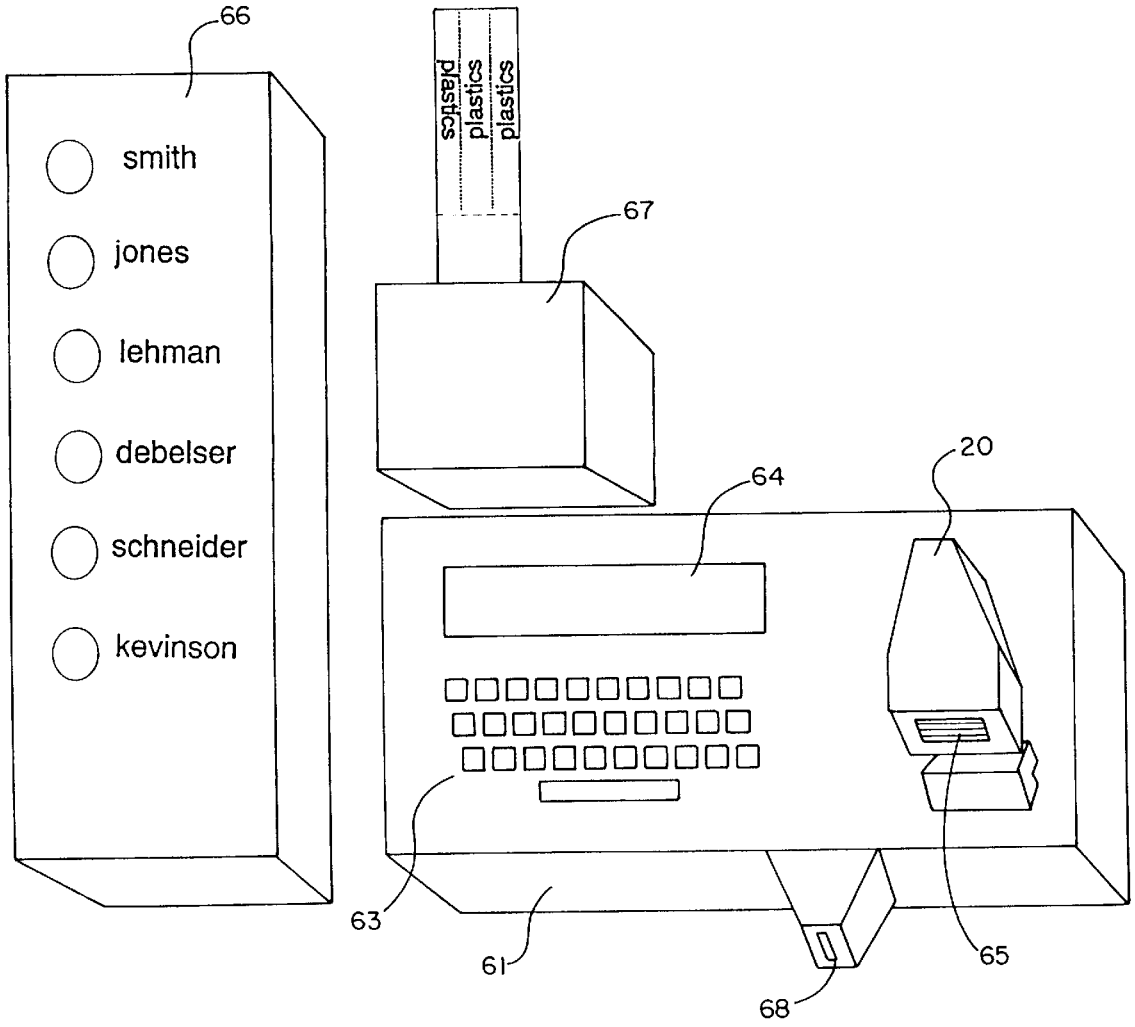
FIG. 12 is a generalized block diagram of the inventive scanning system components.

Referring to FIG. 12, a generalized block diagram of the system is shown in which the scanner is shown at 20 attached to its base computing unit 61, for storing the database and program discussed below, which also includes a keypad at 63 and a display at 64, which in the preferred embodiment is four lines by forty characters. The system performs two core operations.

First, the scanner records the cabinet and drawer location of folders. This is done by passing the scanner by the folders in the various cabinet drawers. A database correlating file id numbers (as read from the machine readable file labels) with the cabinet, drawer and position in the drawer is thus constructed in the scanner 20 and eventually communicated to the base unit. Each drawer has specially coded "end folders" located at both ends of the drawer that indicate to the scanner the cabinet and drawer location being scanned. When a drawer is scanned the operator is required to pass by to these end folders. The scanner also records the position in the drawer where a given folder is located.

The second operation performed by the system is to locate files. In one case, the operator could query the system for a specific file and be informed of its cabinet and drawer location, and position in the drawer. An alternative method of locating a file is to use the scanner to watch for a desired folder (or folders) while the operator passes the scanner by the folders. Initially, it might seem that the operator would have to scan every cabinet and every drawer in the system searching for a desired file (or files). This would be very time consuming and not a practical method for routine folder retrieving. However, since the scanner knows the last recorded cabinet and drawer location of every file, it can direct the operator straight to the appropriate location for scanning. This is done by the LCD display 65 located on the scanner.

Once the scanner detects a sought file it activates an indicator. The indicator can be visual, such as a colored LED, an LCD display or other visual display means, or the indicator can be sound based, such as a bell, tone or other sound indicator, or combination of indicator methods. If the scanner according to its database, indicated a folder should be in a given drawer and upon scanning the drawer, cannot find it, the scanner reports to the operator that the file is missing (via an indicator means similar to that used for the file found condition).

The method by which the operator indicates folders to the base can be as simple as entering a file's id number using keyboard shown at 63. However, it is contemplated that the base will contain another database that correlates arbitrary keyword descriptions with file id numbers and so allowing the operator to locate files by their contents. Keyword descriptions are entered into the base by the operator when a new folder is added. The description can be updated and/or expanded at any time. Additionally, the base is capable of recording the last operator's name to access a given file, thereby providing information as to whom might have the file if it is not in the expected cabinet drawer. This "last user" tracking assumes a means of identifying the operator. For example, the operator can log into the base when beginning a session or, as shown in FIG. 12, the operator must press a specific button associated with the specific operator in order to activate the system (shown at 66). The database and logging techniques are well known in the art.

When a file is removed or added to a drawer, the drawer should be rescanned by the operator to update the database. This process does not need to be rigorously enforced since if at some point it appears a folder has become lost, due possibly to failing to rescan its drawer after being put back, it is generally a quick process to rescan every drawer.

A label printer is an option, shown at 67, that is used to generate the labels for new folders. The label may contain a human and/or machine readable description. In some cases, the file tab on which the label is attached may already have been manufactured with a machine readable file id.

A contact scanner, shown at 68, is provided so that the user, if desiring to examine or modify a keyword description of a given folder, can pass the folder by the contact scanner to initiate the process.

By providing a contact scanner 68 and the scanner 20, it is possible to entirely hide the file id numbers that are represented on the folders' labels. Folders are identified and tracked entirely by operator assigned keyword and other identification systems. The scanner and base transparently do the mapping from these identification systems to the bar code ids.

In the preferred embodiment, the base communicates with the scanner 20 using infrared radiation, which is well known in the art, such as the communication used by Apple Newtons as well as wireless keyboards. Of course, the base 66 could be conductively connected to the scanner 20 using a wire if preferred. Optionally, the base could be sold with a docking station to allow it to be used with a personal computer.

Figure 13:
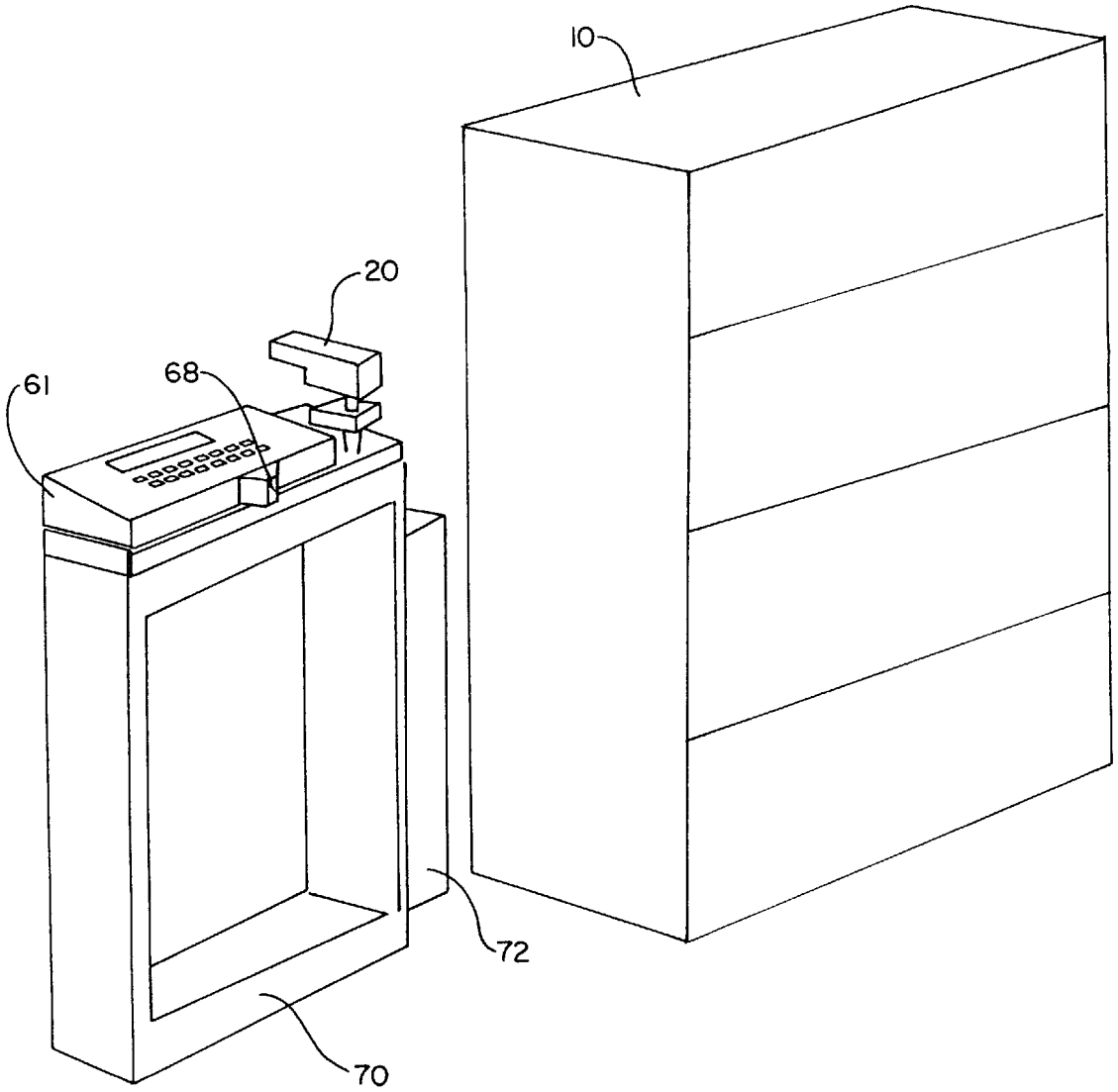
FIG. 13 shows the inventive scanning system on its stand.

FIG. 13 shows the base unit 61 on a stand or pedestal 70. Stand or pedestal 72 will support the label printer 67 (shown in FIG. 12).

Figure 14:
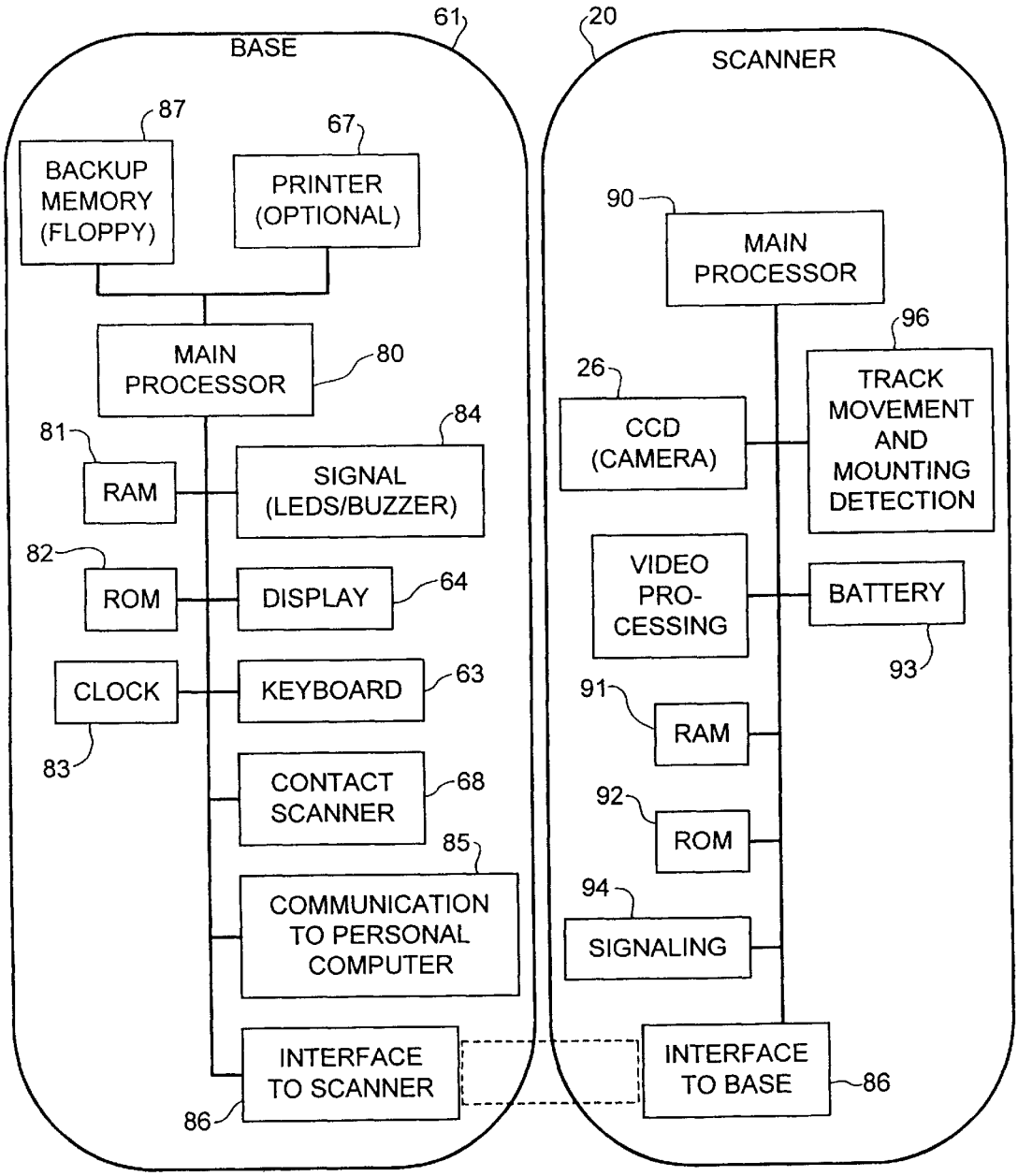
FIG. 14 is a generalized block diagram of the base unit and scanner.

FIG. 14 is a generalized block diagram showing both the base 61 and the scanner 20. Base 61 contains a processor shown at 80 and RAM memory 81 for running programs stored in ROM memory 82. Clock 83 controls the speed and timing of the processor 80. Keyboard 63 and display 64 were discussed above. The signaling block for indicating when a file is located, bar code is bad etc. is shown at 84. The contact scanner is shown at 68. Block 85 represents a docking station for interfacing the base 61 to a standard microcomputer, if desired. Block 86 represents the interface to scanner 20, which as discussed above can either be conductive or wireless. Base 61 can optionally be equipped with a label printer 67 and backup device 87.

Figure 37:
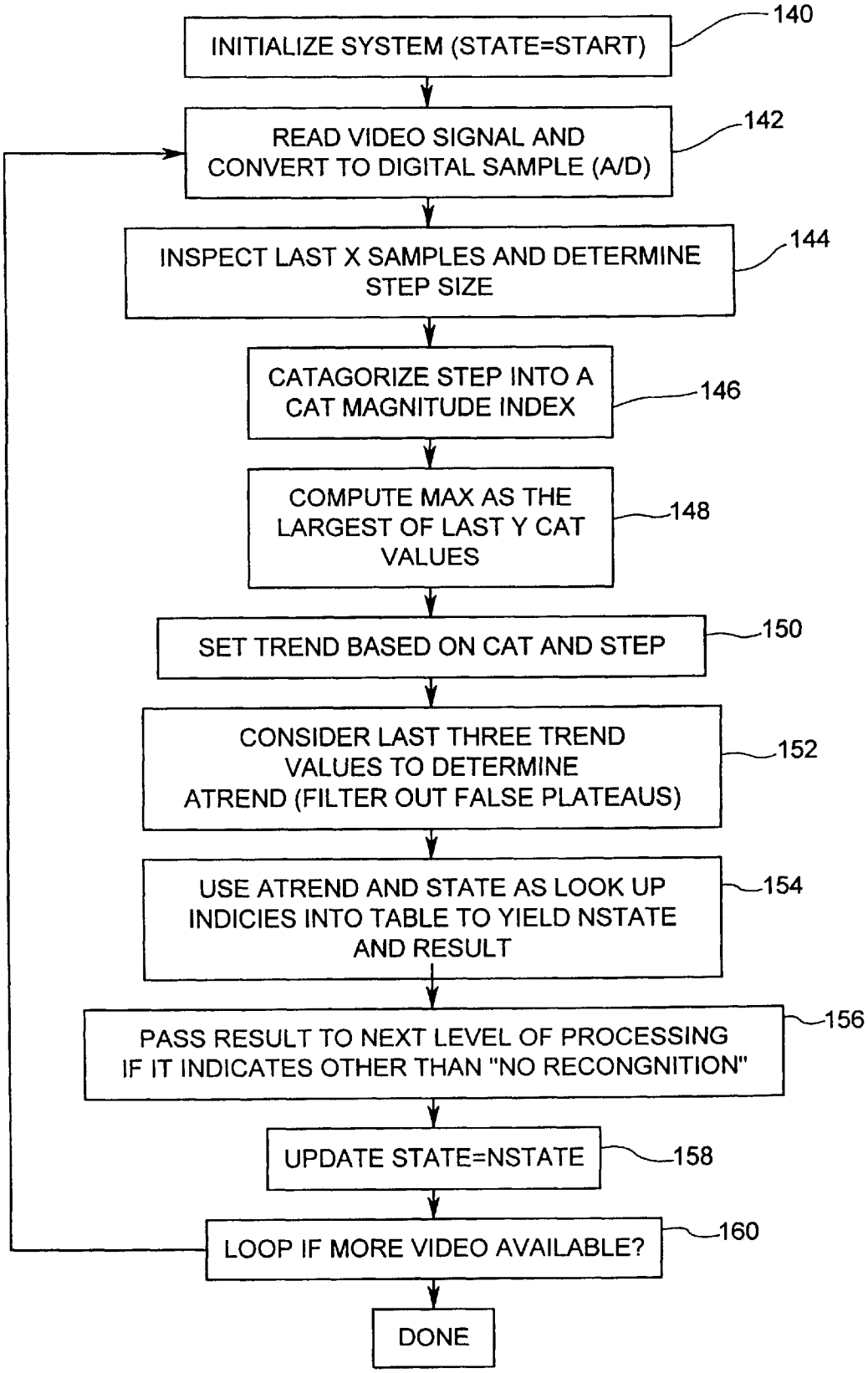
FIG. 37 shows the algorithm for processing the video signal.

Scanner 20 contains a processor 90 and RAM memory 91 for running programs stored in ROM memory 92. The database is also stored in RAM 91. The camera or CCD is shown at 26. Scanner 20 is battery operated and the battery is shown at 93. The signaling for indicating when a file is located, bar code is bad etc. is shown at 94. The video processing block is shown at 95 (which will be discussed further below in connection with FIG. 37). Finally, track movement and mounting detection is shown at 96. When the scanner is placed in contact with the track, block 96 triggers a light to ensure adequate illumination for the scanner, using a contact switch. This block also senses the speed at which the scanner is moved, which is used to improve the accuracy of the processing of the image.

EVL Bar Code

Figure 15:
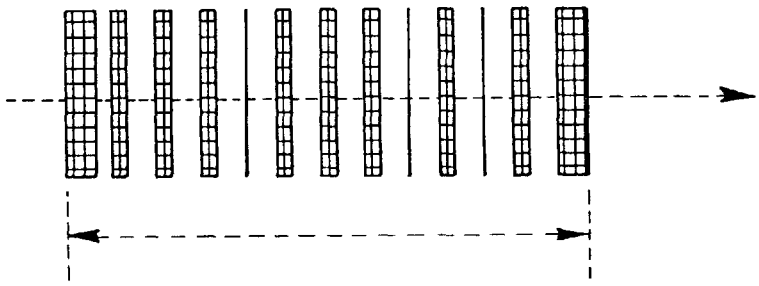
FIG. 15 shows the scan width of a traditional bar code.

The inventive scanner is designed for use with an improved bar code. Most bar code systems require a bar code be entirely scanned from beginning to end in order to read its data. Typically a bar code begins and ends with reserved codes with data stored in between. This is best seen in FIG. 15.

Figure 16:
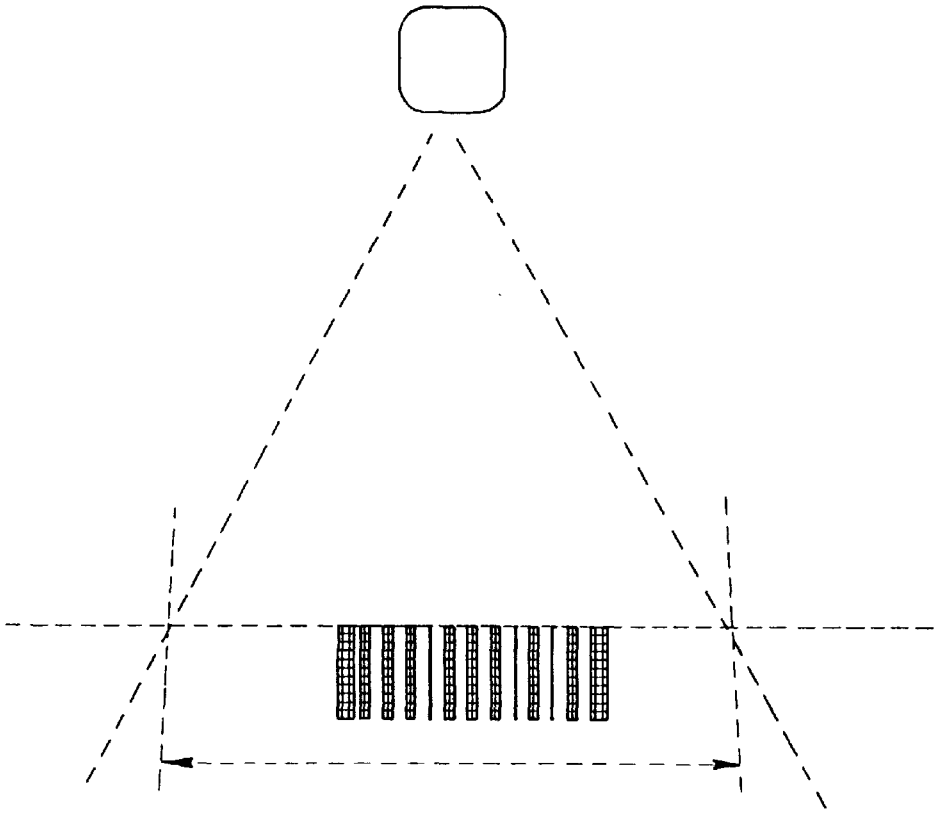
FIG. 16 shows a traditional bar code with an oversized scan width.

The inventive EVL (Eris Variable Length) bar code operates best in an environment where the observing camera (bar code scanner or CCD) view is somewhat fixed with regard to the bar coded item, but at the same time either the camera view and/or the item may shift relative position within a specified tolerance. If a traditional bar code was used in this environment, it is desirable to insure the entire bar code was small enough that it could shift around in the view and still be entirely read. This is best seen in FIG. 16.

The problem with this approach is that the unused area of the view reserved for shifting is essentially wasted. It could contain data. For example FIG. 17 illustrates that if the tolerance is fairly large, for example double the size of the bar code, you can substantially increase the amount of data in the bar code.

Figure 17:
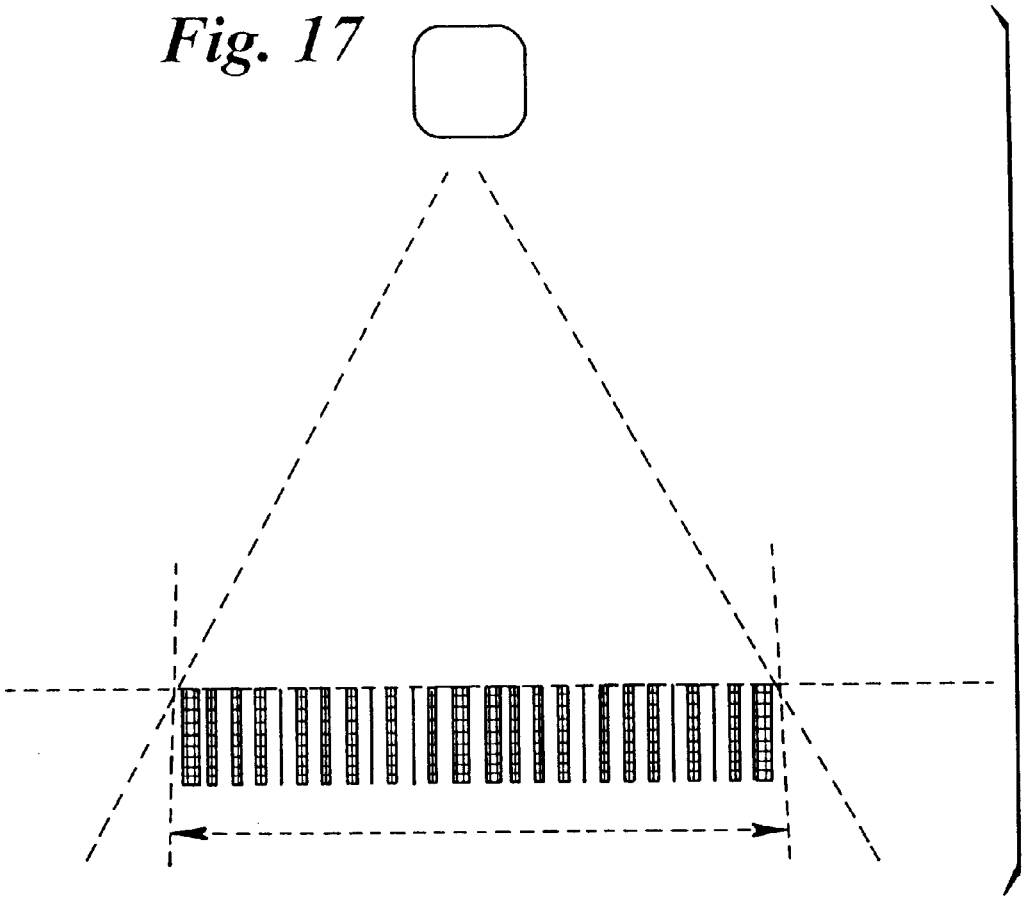
FIG. 17 shows the inventive machine readable code, which fills the entire scan width with repeating basic patterns separated by MARK bars.

Of course the example in FIG. 17 assumes that no shifting can occur, which is often not practical. The EVL bar code achieves full view utilization and allows for substantial alignment shifting through the use of repetition and MARK bars.

Figure 18:
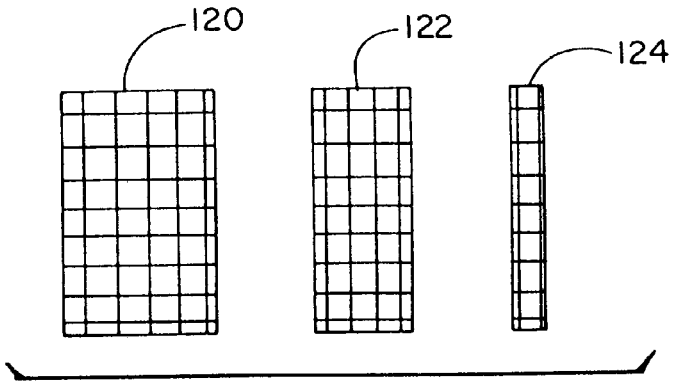
FIG. 18 shows the three symbols used in the Eris Variable Length (EVL) bar code.
Figure 19:
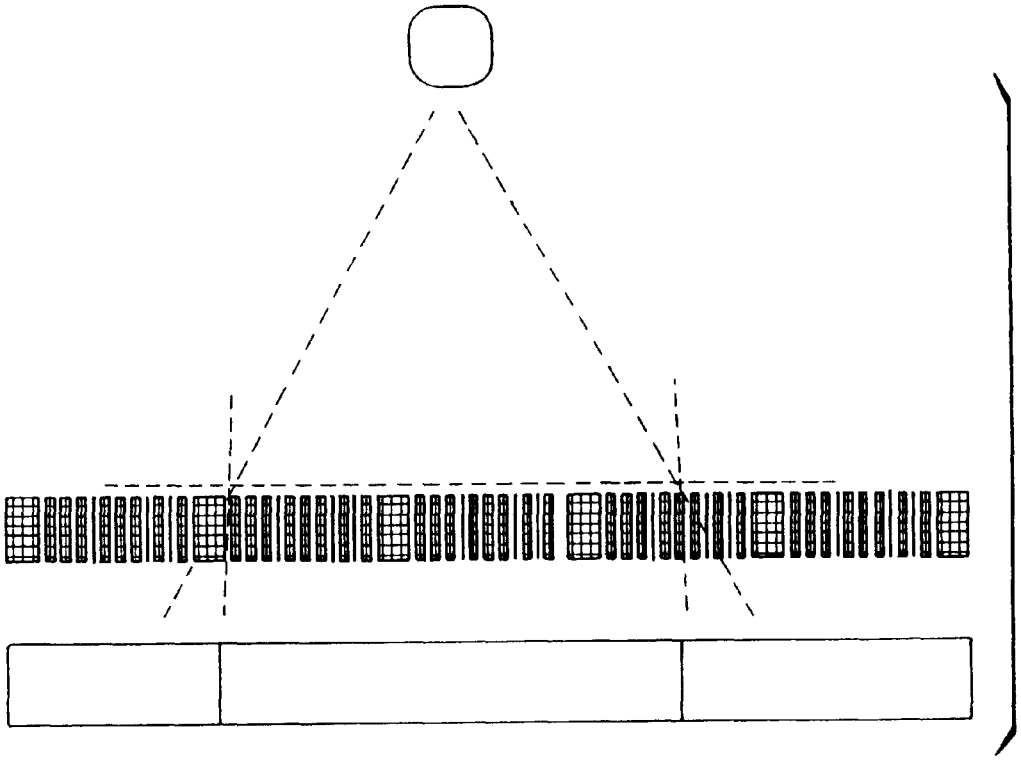
FIG. 19 shows the alignment shift possible while still scanning an entire basic pattern.

The EVL bar code consists of three types of lines: a MARK, a ZERO and ONE. These are shown in FIG. 18 at 120, 122 and 124, respectively. The MARK symbol 120 (or bar) is the widest since it occurs the least frequently. The MARK is used to indicate the beginning of a sequence of ZERO and ONE symbols (data sequence). What differentiates EVL from other bar code systems is that the MARK and data sequence is repeated multiple times to insure the camera's view is always filled, given the possible alignment shifting of the camera's view. See FIG. 19. The shaded area represents the allowable alignment shift, which is adjusted by repeating the basic pattern (including a fractional multiple e.g., 1.75 or 2.5 patterns). Applicant has determined that complete repeated codes are not required and that given expected shifting it is possible to reconstruct a data sequence given 1.75 data sequences. In practice, the lowest fractional multiple will be utilized which provides for adequate redundancy to accommodate expected shifting of the bar code out of the scanner view.

Figure 20:
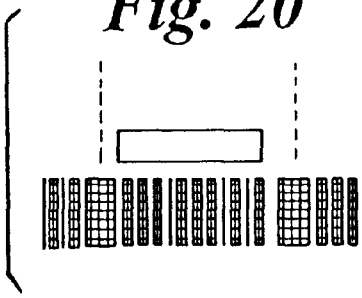
FIG. 20 shows a scan width which is unacceptable for use with the inventive bar code.
Figure 21:
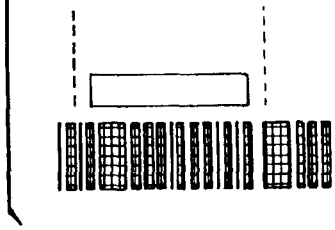
FIG. 21 shows a scan width which is acceptable for use with the inventive bar code.

A basic pattern is a MARK followed by a data sequence of ZEROs and ONES. Full utilization of the view occurs by making the total width of the basic pattern a bit shorter than the view. To be precise, the basic pattern width should be such that one basic pattern and one extra MARK fits within the view. This avoids the possibility that the view manages to cut the left and right side MARKs in half, thus making neither usable and so providing no MARK on which to synchronize. FIG. 20 illustrates an unacceptably wide basic pattern whereas FIG. 21 shows optimum sizing.

Figure 22:
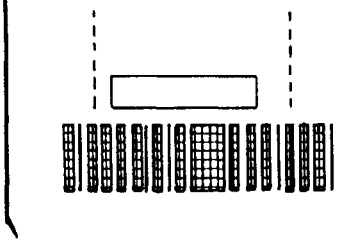
FIG. 22 shows a scan which does not include one entire basic pattern, but includes bars on either side of a MARK bar.

If the alignment shift is less than plus or minus a basic pattern width than you can use a single MARK in the center of the view with all or part of a data sequence to either side, as appropriate for the given tolerance. See FIG. 22.

Figure 23A:
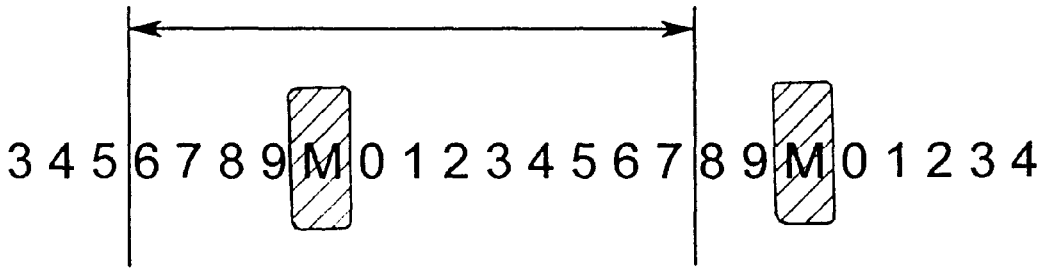
FIG. 23 shows the step by step technique for reconstructing a basic pattern from the scan of FIG. 22.
Figure 23B:
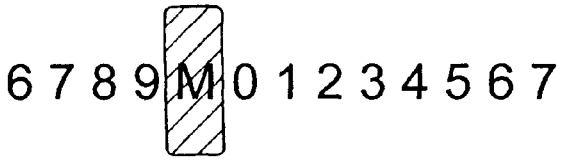
Figure 23C:
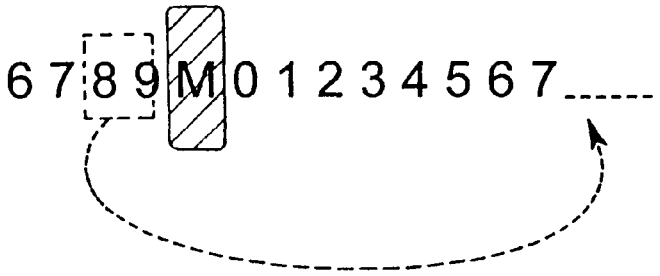
Figure 23D:
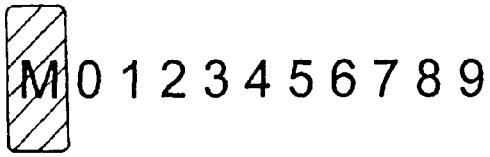

EVL bar code assumes a fixed length data sequence size. This allows the scanner, in the process of decoding, to locate a MARK, read forward (right) for as much as a basic pattern's data sequence as available, and then use the information before the MARK (left) to complete the data sequence. In FIG. 23 the data sequence of ZEROs and ONEs has been replaced by numeric digits where each digit represents part of the bar code's "value". The MARK is indicated by an "M". Recalling that a basic pattern is a MARK followed by a data sequence, in this example the data sequence's value is "0123456789". As you can see in 23(a) the scanner's view does not align properly to contain full data sequence after the MARK. However, because of proper sizing the missing portion of the data sequence after the MARK can be found to the MARK's left. Since the size of the data sequence is known by the scanner (EVL bar code is a fixed size, the size depending on the application), the scanner can determine how much of the sequence after the MARK is missing and retrieve the proper amount of data from the left. This is shown in 23(a)–(d) where the program reads the bars to the right of the MARK, until either it encounters another MARK or it runs out or video signal. If it does not encounter another MARK bar, as will be discussed in more detail below, the program determines the amount of space missing from the basic pattern and reads the bars to the left in that missing space. The program then appends the bars read to the left to the bars read to the right to complete the basic pattern, as shown in FIG. 23(d).

The maximum total physical space that one instance of the basic pattern can take is fixed per application. The number or ONE's and ZERO's that can fit into this fixed space is variable. Assuming that a scan view does not read a complete instance or basic pattern of bars necessary to uniquely describe the file or object, the system can reconstruct the complete instance or basic pattern. The system does this by locating the MARK bar, which is surrounded on either side by ONE's and/or ZERO's. The system reads the ONE and ZERO bars to the right of the MARK bar, keeping track of the physical space represented by these bar codes (N), until either a full basic pattern is read or the system runs out of video signal. Since the total physical space for a single instance of the repeating bar code value is known (T, fixed on an application by application basis), the amount or physical space P that was not filled by the ZERO and ONE bar codes to the right of the MARK bar is computed: P=T−N. Assuming a basic pattern was not read to the right of the MARK, to complete the set, the bars to the left of the MARK bar are read, reducing P accordingly for each ZERO or ONE processed, until P is less than the physical width of the shorter of the ZERO and ONE bar codes. The values read to the left of the MARK bar are appended to the end of the partial set processed to the right of the MARK bar to form a complete and properly ordered reading or the ZERO and ONE's representing a basic pattern.

In sizing the basic pattern's width, if there is a possibility of enlargement or reduction of the pattern due to the distance between the scanner and the bar code, all calculations should be based on the largest (closest) size. Therefore by insuring the width can only be reduced, the effect is to harmlessly provide extra information (i.e., the scanner views more or the repeated basic pattern sequence).

EVL Bar Code Encoding

The EVL bar code utilizes a new technique for encoding a value. Traditional bar code systems grouped a set of white and back bars together to form a character. A character depending on the number or variations in the widths of the white and black bars could assume some limited number of values. The traditional bar code is made up of a start code, a set of characters, and an exit code.

Figure 31:
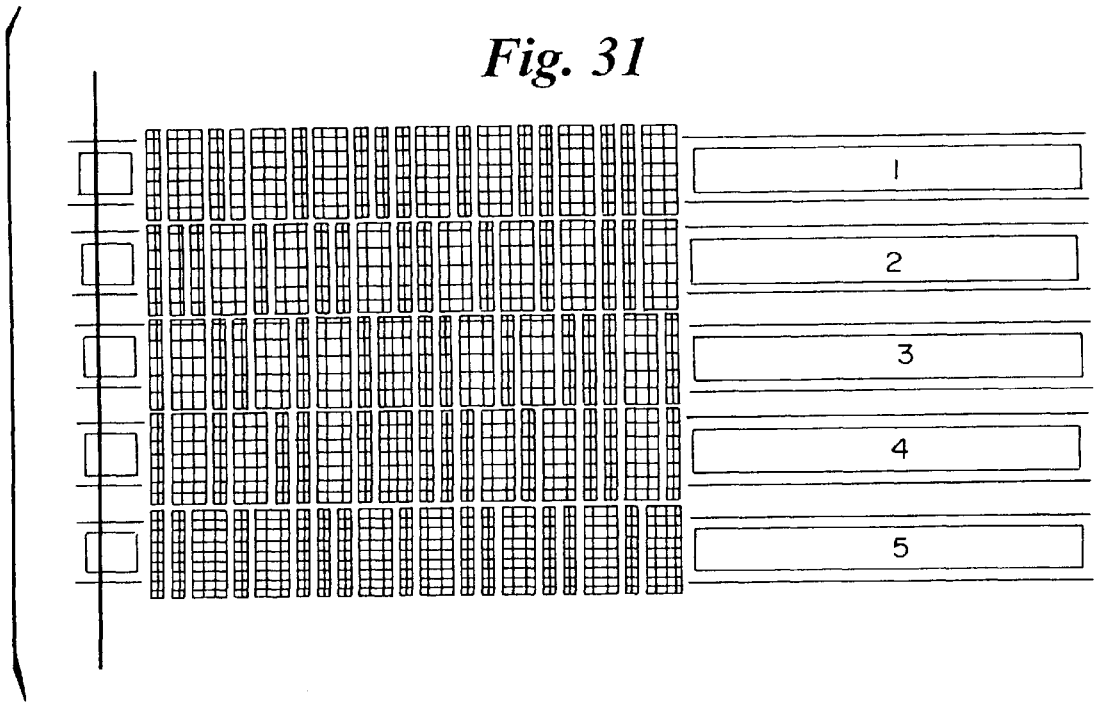
FIG. 31 shows a top view of adjacent bar codes.

FIG. 31 illustrates the character organization of a traditional bar code. Decoding of such a character based system into a binary format suitable for use in a computer is accomplished by recognizing each character pattern, mapping it to a binary value, and collecting these values in the computer's memory. For example, if each character represents a numeric digit (zero through nine) the general algorithm for constructing a binary value is:

accumulator=0 for each character:

1) i=binary value of current character 2) accumulator-(accumulator*10)+i

Figure 24A:
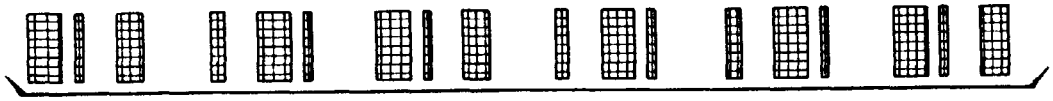
FIG. 24 shows the traditional bar code and character spacing.
Figure 24B:
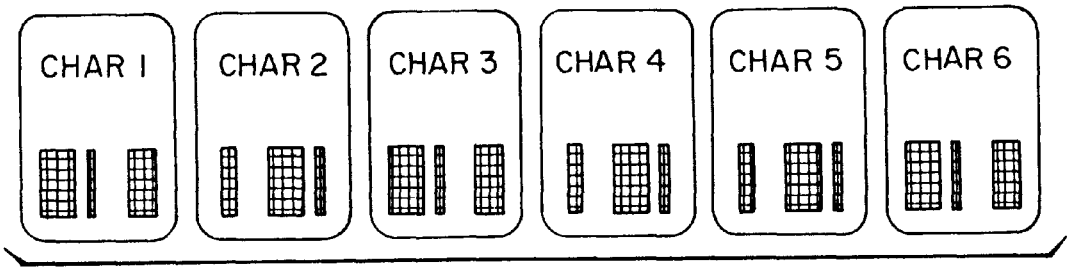

However, due to the fixed spacing introduced by the concept of a character, a good portion of the available information space is not utilized. The information space refers to the number of ways in which white and black lines of various widths can be arranged to create a set of unique states. The information loss occurs because a wide black line cannot cross a character boundary. FIG. 24 illustrates the number of combinations possible using a wide and a narrow black line system (with fixed white spacing) where 25(a) shows the combinations making up the character set and 25(b) shows the total combinations using a two characters bar code sequence.

Figure 26:
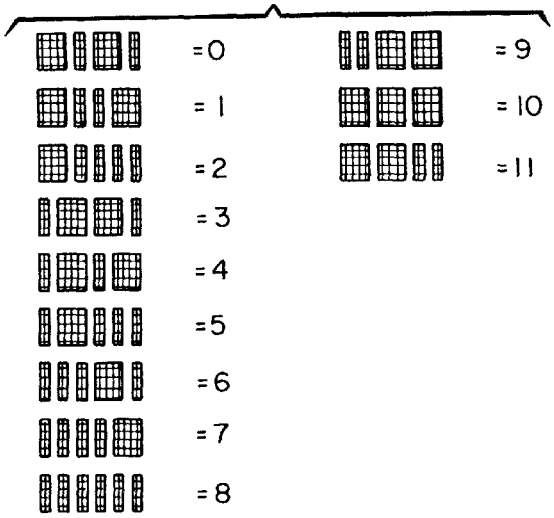
FIG. 26 shows the additional combinations using variable length encoding.

FIG. 26 shows how three additional combinations are to achieved when character boundaries are not required. Notice that the three additional bar code values all involve a wide band overlapping what would normally have been a character boundary.

Figure 27:
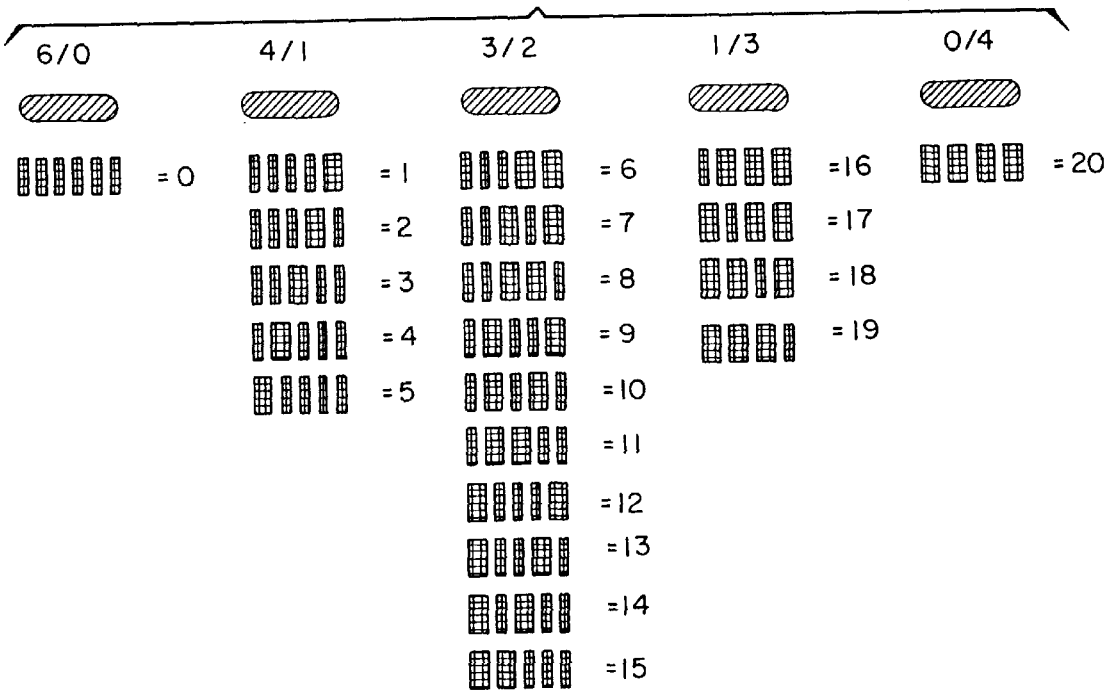
FIG. 27 shows the numeric equivalents in a 12 unit space where a ONE is 2 units and a ZERO is 3 units.

FIG. 27 reduces the width of the ZERO so that there are is no longer an even multiple of ones that fit in a ZERO. Up to this point a ZERO was four units wide and ONE was two units. By changing to a ZEROs of three units and a ONE of two units more variations occur due to partial but maximal filling of the information space (which is 12 units in this example). The header on FIG. 27 indicates the number of ones and ZEROs in the variations below.

Thus applicant started out with nine bar code values generated using two characters, eliminated the concept of a character boundary, and adjusted the ZERO and ONE widths to avoid an even width multiple. This resulted in 21 bar code values.

Figure 25A:
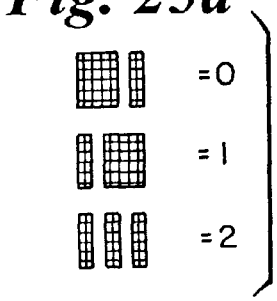
FIG. 25 shows the number or variations available using a two character wide narrow character based bar code.
Figure 25B:
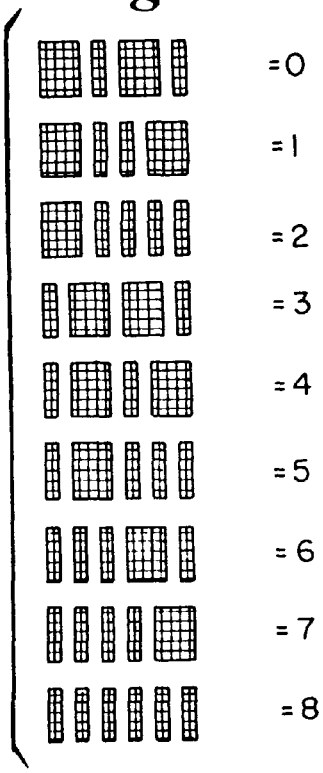

To get a feeling for the efficiency of variable length encoding we compare two cases. In both cases a ZERO is encoded in four units and a ONE in two units. In the first case a character is made up of six units allowing for the three patterns shown in FIG. 25. The second EVL case uses the same ZERO and ONE width definitions and in both a total a 24 units is available. In the character case you get 81 (3**4) combinations. Using EVL you get 233.

The EVL bar code packs almost three times the information content in the same area. This improves as the width of the ONE is reduced relative to a ZERO while keeping the non-even multiple requirement.

In these examples the white space area is simply used as a separator for the variable width ZERO and ONE bars. However, there is no general reason why the white gaps cannot be of variable width and thus carry information.

Figure 28:
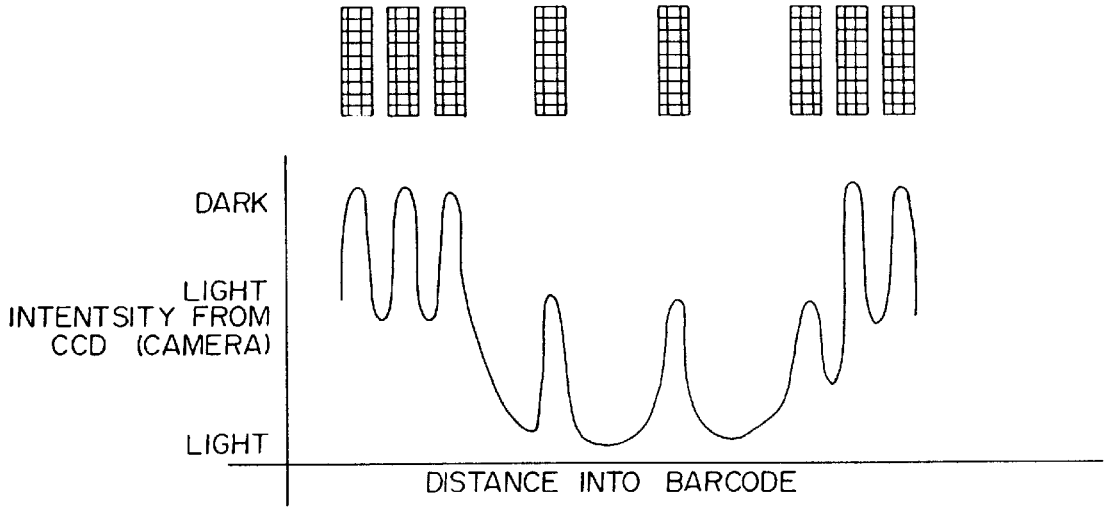
FIG. 28 is a graph showing light intensity readings when varying white gaps are present.

However, in practice it has been found that when using a CCD based scanner with a helps that keeping the white gaps a consistent width greatly helps the video wave shape identification process. This occurs because varying the white gaps affects the blackness of the neighboring bars whereas if the white gaps are of consistent width they become consistent pulses between the no video produced by the black bars. FIG. 28 illustrates this effect. Notice how the black bars surrounded by large white gaps (in the middle of the graph) are shifted down: their darkest points are as light as some of the narrow white gaps.

Figure 29:
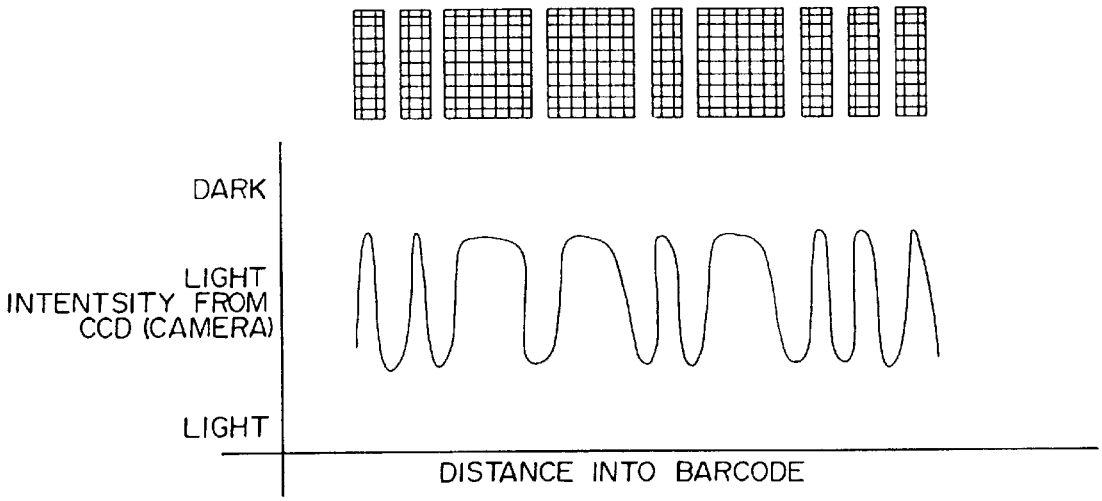
FIG. 29 is a graph showing light intensity readings when white spaces are consistent and the dark spaces varies.

FIG. 29 illustrates the light intensity readings when the white space is consistent. These are much easer to decode. Basically the more white that is present produces generally increasing intensities, but widening a dark area does not produce increasing darkness (relative to what happens by widening a white gap). Another important reason for using narrow consistent white gaps to separate variable width black bars is that when using a CCD/lens system, the out of focus effects to the wave form are not as severe.

A major obstacle arises when using a variable length encoding where there are no character boundaries: how to map the varieties of patterns into binary values. Note binary values can be interpreted as numbers, or characters or any equivalence. In FIG. 27 there are five sets of subpatterns where the first contain all ONE's or no ZEROs, and the second 4 ONEs and 1 ZERO and so forth (as read from the top of the figure). The number of ONEs and ZEROs that can fit in the information spaced is determined by simply checking that the total width when a desired number of ZEROs and ONEs are combined fit in the information space. EVL requires the information space is maximally utilized—e.g., you cannot have a single bar and leave the rest of the area empty (white). Because of this requirement there is no pattern involving two ONEs, since this would not allow three ZEROs to fit, but the space left over with two ZEROs allows for a third one.

Figure 30:
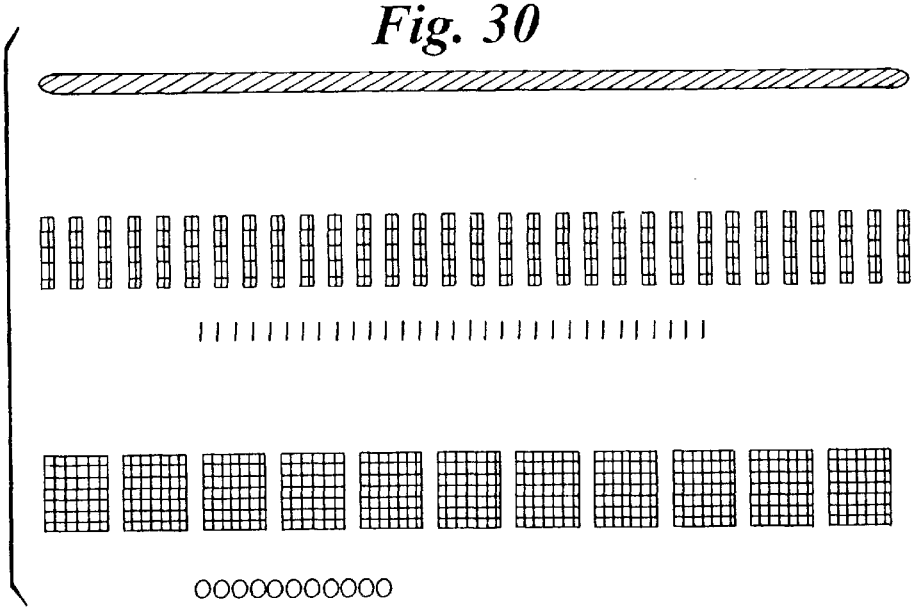
FIG. 30 shows the maximum information per unit space when using all ONE's or ZERO's.

FIG. 30 shows how different the bit width of the extreme values of a wide EVL bar code. When the information space is packed with ONEs you produce a 31 bit value. However, since ZEROs are wider, the largest all ZERO value is only 11 bits. Further, and this is pan of the main point, by directly converting the ZEROs and ONEs to binary you can get a value as large in this example, as two billion. However, the actual number of unique patterns is far fewer (around 380,000). If you consider the largest value possible around two billion, the values resulting from direct transition are sprinkled throughout the possible range (0 to around two billion).

It is very useful, in most environments to sequentially generate bar code values: e.g., 1,2,3,4,5 etc. Difficulties arise in using a set of values when there are many and large breaks in the values—e.g., if bar code values 0, 23, 102, and 999 are the only valid states then you are getting only four states in a value range of 1000 (0 to 999). A computer cannot use such a sparsely utilized bar code value to directly index into a table (without wasting most of the table). In other words, it would be much better in the prior example to have the bar code values 0, 1, 2, and 3. The mapping system about to be described is a method of switching (converting) between the "bar code values" that are sparsely distributed over a large range and "binary values" that are sequential. Spare utilization of a value range has arisen because of EVL's non-character based encoding.

Part of the EVL bar code system is a method of switching between line format and binary. In line format a value is maintained in a buffer as a sequence of ZERO's and ONE's which correspond to ZERO and ONE black bars. The binary representation is a value that sequentially counts up from zero to a maximum that is based on the number of line pattern variations possible. In the example in FIG. 30, the binary value can read around 380,000 and requires only 19 bits of precision. The line value if directly translated to binary, on the other hand, requires 31 bits of precision.

The method of converting from line to binary format is as follows:

| Variable | Comments |
|---|---|
| assuming: | |
| pattern[x] | is an array containing 0 and 1 for the line's symbols (i.e. bars). |
| pat1 | is the number of symbols in pattern. |
| baser[x] | is an array indexed by the number of zeros in the line description (pattern) that provides a base binary value which is added to the value generated by processing each line in pattern. |
| mv | is the binary version of pattern (computed). |

-continued

| | |
|---|---|
| nz | is the number of zeros in pattern. |
| adjust[s][z] | is an array indexed by both the number of symbols in the unprocessed portion of pattern and the number of zeros in this portion. It provides a value to add to mv that accounts for encountering a one as the next symbol processed from the line representation. |
| total_wid[z] | is an array indexed by the number of zeros in pattern that indicates how many elements are expected in the corresponding basic pattern. |
| Code | Comments |
| if(pat1! = total_wid[nz])error | verify total number of symbols is that expected given number of zeros in the line. |
| mv = baser[nz] | start current binary value at base given the number of zeros in pattern. |
| for(i = 0); i! = pat1; i ++)<br>{ | cycle through all the symbols in the line. |
| if(pattern[pat1-i-1]= =0)<br>nz = nz-1 | if at a zero (traversing the array backwards) ten reduce the number of zeros left in pattern and make no change in the accumulated binary version |
| else | otherwise if at a one then add in adjust to binary version that is a |
| mv = mv + adjust[pat1-i][nz] | function of the remaining unprocessed symbols of the line |
| } | and the number of unprocessed zeros |

Each ZERO and ONE symbol decoded from the bar code is present in an array pattern (line format). The prior algorithm basically cycles through this array and performs at worst a table access for each element. This algorithm is fast and efficient for converting a line representation into a sequential binary value.

Next the algorithm will be described. First, it should be realized from FIG. 20, that EVL bar codes can be subcatagorized into classes based on the number of ZEROs (or ONEs) in the data sequence. For each class there will be a fixed number of unique ways the ZEROs and ONEs can be rearranged. By adding up all the permutation counts for each class you get the total number of unique patterns possible. This count is the upper non-inclusive limit or the binary (integer) value range (starting at zero). The EVL bar code in FIG. 20 has five classes for a total of 21 unique patterns thus representing the integers from 0 through and including 20.

The following states the role of each of the key variable in the prior algorithm that converts from line to binary format:

Pattern[x]: This array is built up by the scanning process as it decodes the EVL bar code, locates the basic pattern and converts its ZERO and ONE symbols into 0 and 1 values.

Pat1: This count indicates the number of ZERO and ONE symbols in pattern.

nz: This is the number of ZEROs in pattern. It is generated either during the decoding phase or simply by scanning the pattern array and counting the number of ZEROs.

The following arrays are generated prior to scanning.

Baser[z]: This array is generated by breaking the set of all possible EVL bar code patterns into classes, where each class is identified by its number of ZEROs, and assigning offsets into the overall binary range for each class. The array is indexed by a zero count identifying a class. For example, given four classes of, 1, 2, and 3 ZEROs, each class might have 1, 5, 7, and 1 unique patterns, respectively. For an example of the patterns available with 5 classes, see FIG. 27. The offsets for each class could then be assigned as 0, 1, 6 an 13. The overall binary range for this EVL barcode would be 14 values ranging from 0 through 13. Basically this is just arbitrarily starting the binary equivalences for the unique patterns in a given class after a prior class's assignments.

For every baser[z] element that is initialized the total number or symbols in the class is stored in total_wid[z]. The purpose or total_wid is to detect and reject initial combinations (from a basic pattern) of ZEROs and ONEs that are invalid. This occurs for example when due to tolerance in the widths of ZERO and ONE symbols, as well as synchronization issues, an insufficient number of ONEs are collected during the scanning process given the overall basic pattern width.

Adjust [s][z]: This array is generated by class. Therefore, one of its indices (z) corresponds to the class being addressed, where the class index is based on its number of ZEROs. It contains an offset based on a symbol count to add to an accumulator if a ONE (versus a ZERO) is removed from one end. Focusing on a given class, the other index is symbol count currently being processed. Given that the total number of symbols is known and the number of ZEROs (which implies the number of ONEs is known) there will be specific number of ways these ZEROs and ONEs can be arranged (number of permutations). The following shows the permutations involving two ONEs and three ZEROs, for an overall symbol count of five (the number of ONEs and ZEROs in the sequence).

| | |
|---|---|
| 11000 | 00110 |
| 10100 | 00101 |
| 10010 | 00011 |
| 10001 | |
| 01100 | |
| 01010 | |
| 01001 | |

It should be noted that if you were given five symbols where each could be either a ZERO or a ONE, this would be a standard binary value. Therefore five bits would produce 32 permutations (values). However, because the EVL bar code system is based on ZERO and ONE symbols that have different visual widths, there is not sufficient space in a basic pattern to allow any "bit" to assume either a ZERO or ONE slate. This is why the EVL bar code's ZERO and ONE symbols cannot directly represent a sequential binary range. If somehow a ZERO and ONE symbol were to have the same visual width a direct translation to sequential binary would be possible. The following are the binary permutations of a five bit value where there is no restriction as to the number or ZEROs and ONEs:

| | | | | | | | |
|---|---|---|---|---|---|---|---|
| 00000 | 00001 | 00010 | 00011 | 00100 | 00101 | 00110 | 00111 |
| 01000 | 01001 | 01010 | 01011 | 01100 | 01101 | 01110 | 01111 |
| 10000 | 10001 | 10010 | 10011 | 10100 | 10101 | 10110 | 10111 |
| 11000 | 11001 | 11010 | 11011 | 11100 | 11101 | 11110 | 11111 |

The adjust array lets you start with s symbols containing nz ZEROs. The conversion to binary process involves removing a symbol from the input array until none are left. Prior to removing a symbol it is processed: if the symbol is a ZERO then no adjustment is made to the overall accumulated binary value. However, if a ONE is present then adjust[s][nz] is added to the accumulator. The symbol is then removed with nz decremented if it was a ZERO. The algorithm repeats this process until s goes to zero.

The method of constructing the adjust array is to recursively consider for a given s and nz, the number of permutations possible by the remaining symbols if the lead symbol s removed. There will be a count for the case where the lead symbol is ZERO (lead_zero) and if it is a one. The adjust [s][nz] array element is set to the lead_zero value (for each s and nz class). The baser array contains offsets that reflect stepping over the overall combined ZERO and ONE permutation counts (for each class) and with the adjust array providing the detailed offset for setting over a ONE (given an s and nz class). The offset for a ONE is the permutation count of the number of ZERO permutations below it.

Border and Identification Bar Codes

Figure 32:
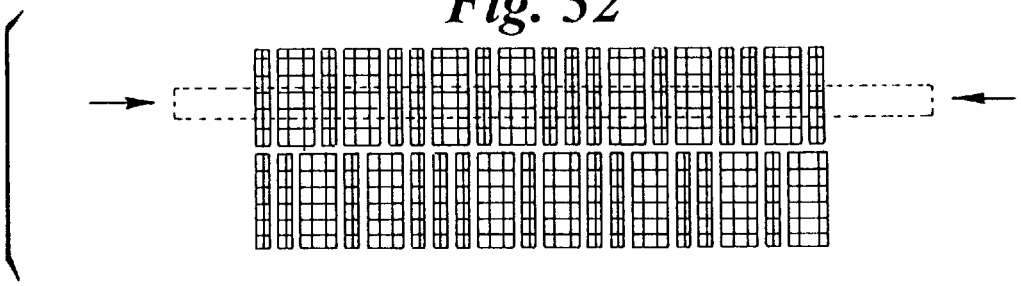
FIG. 32 shows a top view of a good scan through a bar code.
Figure 33:
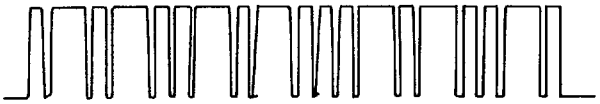
FIG. 33 shows a waveform from the scan of FIG. 25.

A major problem that occurs when you place many bar codes in close proximity such that the bar codes are on top of each other, is rejecting the invalid bar codes that appear as you move from one to another. FIG. 31 shows five bar codes positioned as they might appear on folders in a filing cabinet (the view is looking down on the folders). FIG. 32 shows a scan area going through the center of a bar code which produces an input wave form to the scanner as represented by FIG. 33.

Figure 34:
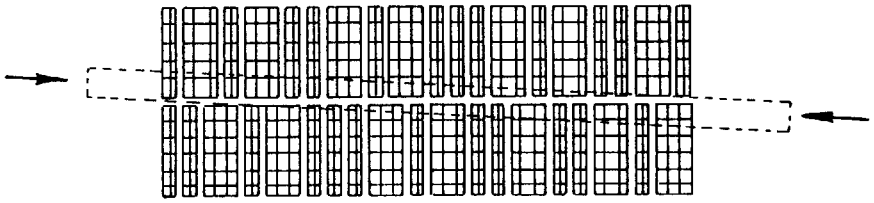
FIG. 34 shows a top view of a bad scan through two bar codes.
Figure 35:
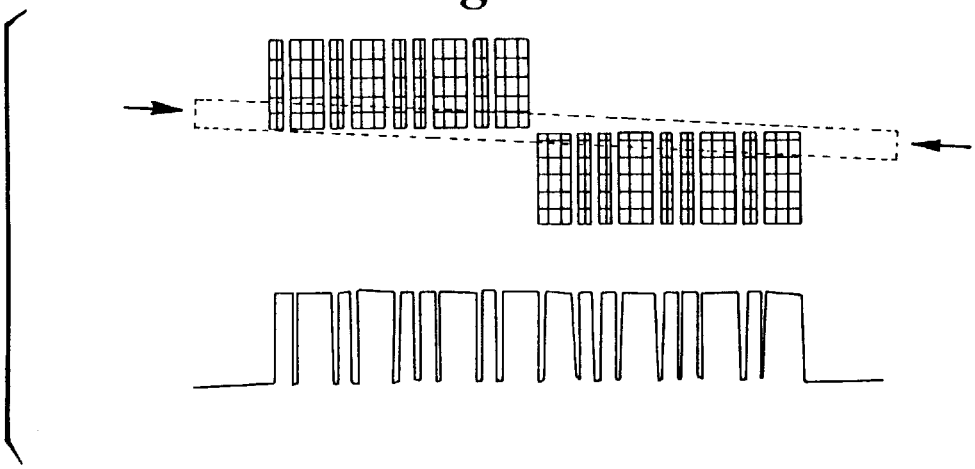
FIG. 35 shows a waveform the scan of FIG. 27.

As the scanner moves along parallel to the bar codes FIG. 34 illustrates how the scan area will cross through two and blend adjacent bar codes, particularly if the area is at a slight angle to the bar codes (i.e., not completely parallel). FIG. 35 shows how the wave form processed by the scanner is a combination of two bar codes.

There are various approaches to eliminating the bad transitional bar code readings that occur while passing from one bar code to another. For example, validating the shape of the wave form and insuring a particular value (wave form) is stable over a reasonable scanning distance generally eliminates all the transitional states.

However, the ability to reject bar code readings in an environment where a portion of a bar code may be corrupted (e.g., the bar code gets scratched) leads to the possibility that a given folder can become lost because the system cannot read its bar code and therefore never acknowledges the associated folder exists.

This problem is addressed by two solutions. First, a short tone is generated by the scanner as it passes over a valid folder. This gives the user the chance to notice the error when the tone is missing as the scanner passes over a corrupted folder. However, this by itself requires excessive user interaction in the scanning process and thus exists mainly as feedback to the user, when desired by the user, that the scanner is functioning.

The second method of detecting when a folder's bar code has been missed is automatic and reliable, thus providing the confidence level required by a user when relying on an automated system to track folders. It involves placing a different border bar code pattern next to each identification bar code. Thus, a folder's label contains a border bar code pattern and an identification bar code, as well as possibly a human readable folder description.

The identification bar code decoding process used by the scanner rejects a bar code reading if its suspects there are any flaws. It must be perfect, which is reasonable since it is undesirable to report folders in locations in which they are not located. The border bar code decoding on the other hand, looks for any partial reasonable reading of a border to conclude the scanner has reached a border. Since the border recognition is simply true or false, the system does not have to view a completely valid border pattern in order to report the detection of a border.

Figure 36:
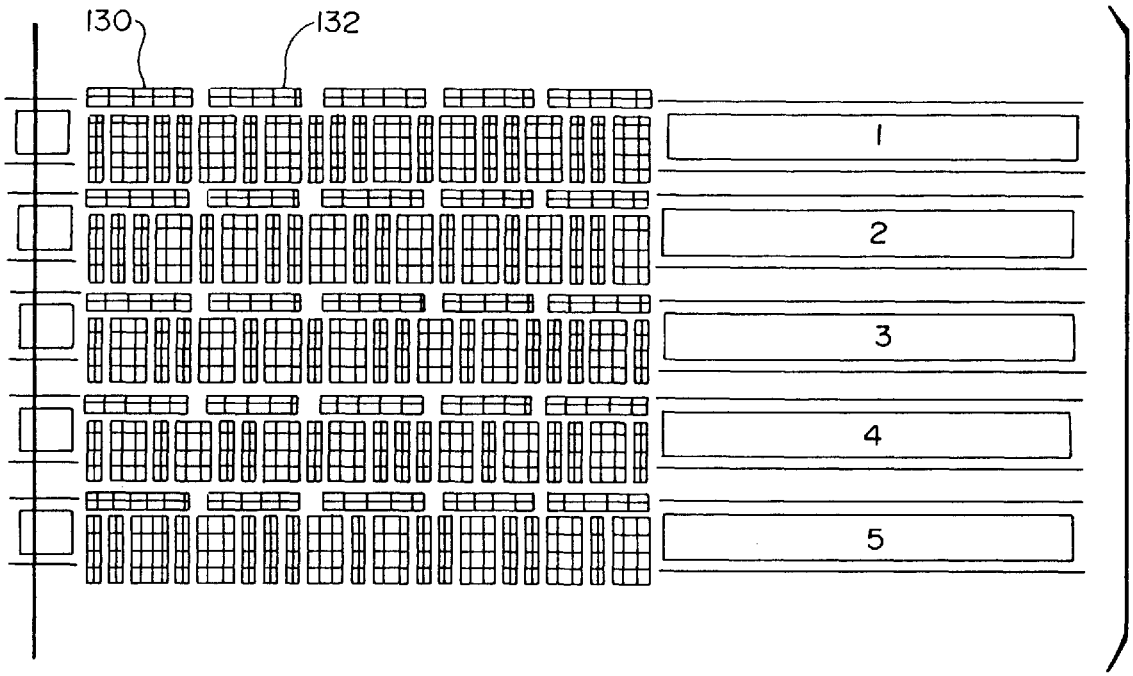
FIG. 36 shows a top view of border and identification bar codes.

By insuring that there is a very high likelihood that a border is detected the system can automatically detect when it has passed over a given folder without recognize the associated identification bar code. In this situation the scanner alerts the operator with a beep and warning light indication. FIG. 36 shows five folders with both border and identification bar codes.

The particular border pattern used in the invention is an alternating fat and thin bars, shown respectively at 130 and 132, where both these bars are substantially wider than any of the bars used in the identification bar code. This increases the chance of recognition under adverse conditions since the fat and thin bars are larger than the ZERO, ONE, and MARK bars. The definition of a border involving both a fat and a thin bar aids in rejecting false detections when passing over a folder's contents.

Video Signal Processing Algorithm

It has been thus far described how the EVL bar code is observed and converted into a folder id. The actual method of processing the video signal generated by the CCD, recognizing the various possible bars (ZERO, ONE, MARK and FAT and THIN borders) is done utilizing the algorithm shown in FIG. 37.

In block 140 the system is initialized. In block 142 the video signal is read and converted to a digital sample using an a/d convertor.

At block 144 the last X samples are inspected (video signal converted to binary using an a/d) and conclude a step size (STEP). This step size indicates how much the video signal has increased or decreased. The last X samples are checked since the transition time of the video signal when moving between light to dark depending on the aid sampling frequency and the resolution for the CCD, may span multiple samples. X is chosen by considering the maximum number of samples required in order to see a near lower and near upper bound signal level when moving from a light to a dark input (or vice versa).

At block 146 the algorithm categorizes the step size (STEP) into a magnitude description (CAT)—e.g., small, medium and large. In practice sixteen levels have been found to be sufficient.

In order to deal with varying overall degrees or video so signal amplitude, and so distinguish between what would be noise in a high level signal and information in a low level signal the next process is to maximize a set of Y previous STEP readings and conclude the largest (MAX). Y should be chosen such that it spans the dark/light transition periods of the video. This is shown at block 148.

The algorithm reconsiders the current video STEP given the determined MAX which is characterizing the video signal's dynamic range over a limited window (the window's size is function of Y). Note that a video signal is generally stable during sampling through a dark or light region, and the issue of noise rejections occurs during the transitions from light to dark and vice versa. A video signal direction trend (TREND) of either increasing, steady or deceasing is concluded. This is shown at block 150.

In some situations it has been found that a generally increasing or decreasing trend may be interrupted by a single steady state (e.g., due to noise and/or vibration of the scanner) and thus filtering was added to convert the following patterns (+=increasing trend, −=decreasing trend, .=steady trend):

+. +−>+++

−.−−>−−−

This filtering requires the current TREND be moved through a shift register containing the last three TRENDS and an ATREND deduced reflecting a possibly corrected prior TREND reading. Note, ATREND is delayed one sample processing cycle in time. The filtering is shown at block 152.

The algorithm considers the ATREND and current STATE together to yield a new NSTATE and RESULT, shown at 154. This is typically implemented by generated an index from the combined ATREND and STATE values into a table. The value read from the table contains an NSTATE value and a RESULT. NSTATE replaces STATE (shown at 158) for the next cycle and RESULT indicates either "no recognition at this point" or a value representing the shape of a recognized video signal. Generally after recognition the NSTATE value will contain the initial start-up state for overall processing (reflecting that the system is now seeking the beginning of another waveform to identify.) If RESULT indicates a value other than "no recognition" then the value is passed along to the next level of processing for recognized video signal components (ZERO, ONE, MARK, etc.), shown at 156.

The algorithm then loops back to 142 at 160 until the entire video signal has been processed.

The various detail start up and initialization processes are system dependent, and not covered in detail herein, but are believed to be routine engineering.

This process can be implemented in a microprocessor, or for speed considerations, can be implemented in hardware using a gate array and a ram chip. The ram chip contains various tables such that during the execution of the above algorithm:

at block 146 STEP is presented to the ram with appropriate table selection as an address and CAT is returned on the data bus;

at block 150 STEP and MAX are presented to the ram with appropriate table selection as an address and TREND is returned on the data bus;

at block 154 TREND and STATE are presented to the ram with appropriate table section as an address and RESULT and NSTATE are returned on the data bus.

Thus the processing of a single a/d video sample is accomplished in three ram accesses under the control of a gate array. RESULT values that contain recognition information are passed to a microprocessor that continues with the overall process (EVL, etc.)

A key aspect of this wave form recognition algorithm is the table from which NSTATE and RESULT are fetched. This table is basically converting a current state and trend into a recognition result and a new state for the next cycle through the loop. A recognition result of "no recognition" indicates that additional samples are required to continue to walk the state index (generated using STATE and TREND) through the table until the wave form is recognized, or course, one of the recognition value that can be returned is "error", indicating the shape recognized is not useful. In other words, the algorithm and table will recognize all possible wave forms. It is up to the user to assign meaning to each possible wave form.

A suitable table construction program would take the desired shapes and initialize appropriate table entries for their recognition and set all other possible shapes to be recognized as an "error" or bad shape. Note that the construction program generally will make slight variations to a desired shape S so that slightly different shapes from the given shape S are also recognized as S.

In the case of processing a series of bar code shapes (ZERO, ONE:., MARK, etc.) there is no single wave form to be recognized, but sub-wave forms corresponding to bar codes. Therefore, as a matter of implementation for processing a set of sub-wave forms, the NSTATE value should indicate a restart point in the table (typically the same point as STATE is initialized to at the beginning of processing) when a recognition is generated (indicated by a RESULT other than "no recognition").

In simpler terms, assuming you are at a STATE N1, this will correspond to having recognized a certain (including the no case) portion of the wave form. After inspecting the next sample from the wave form a TREND is determined, indicating if the signal is increasing (going up), steady or decreasing (going down). The STATE and TREND values are used together as indices into the table. Depending on TREND, there will be three possible new STATE (N1up, N1steady, N1down) values with corresponding RESULTs. These three pairs correspond to the answer of the question, for example, in the decreasing TEND case, "what if the wave form goes down". If the answer "this is a wave form of some shape Z" then the STATE/TREND table entry's RESULT is set to a code reflecting Z and generally the NSTATE component is set to a table entry that restarts the recognition process. However, if the answer upon considering the new TREND and current STATE is that further samples are required in order to make a conclusion, the RESULT is set to "no recognition" and the NSTATE component is set to a position in the table that continues assuming the wave form thus far processed. In other words, essentially the table is a form of a tree where every branch breaks into three smaller branches or eventually leaves. The TREND values give direction (take right, middle or left branch) for moving through the various levels of branches. Finally, at a certain point, a branch will come to a leaf (an end point) which contains a RESULT indicating what wave form shape corresponded to the path to the leaf.

There are many other ways or recognizing a wave form, but the method used here is particularly fast and well suited for computers.

The above Examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

What is claimed is:

1. A file tab attached to a file folder comprising:

tab support means, the tab support means being substantially planar and having front and back sides, a lower and upper portion and an upper edge;

a tab portion, wherein the tab portion is attached to the upper edge of the tab support moans and is supported by the tab support means, the tab portion having a top surface, the top surface being generally perpendicular to the tab support means and the file folder, wherein a portion of the tab portion is offset from the tab support means and overhangs the tab support means so that the file tab is generally "L" shaped and wherein the tab is wide enough to carry bar code information on the top surface; and adhesive means attached to the back side of the lower portion of the tab support means, the lower portion of the tab support means being attached to the file folder in a generally linear fashion and wherein the upper portion of the tab support moans extends above the file folder a distance which is wide enough to carry readable information.

2. The file tab of claim 1 wherein the tab portion carries human readable information about the object it is attached to.

3. The file tab of claim 1 wherein the tab portion carries machine-readable information about the object it is attached to.

4. The file tab of claim 1, wherein the tab portion further includes a side surface, the side surface being substantially parallel with the tab support means, and wherein the tab portion and the support surface form an inverted U.

*5. A file tab attached to a file folder comprising:*

*tab support means, the tab support means being substantially planar and having front and back sides, a lower and upper portion and an upper edge;*

*a tab portion, wherein the tab portion is attached to the upper edge of the tab support means and is supported by the tab support means, the tab portion having a top surface, the top surface being generally perpendicular to the tab support means and the file folder, wherein a portion of the tab portion is offset from the tab support means and overhangs the tab support means so that the file tab is generally "L" shaped and wherein the tab is wide enough to carry bar code information on the top surface; and*

*attachment means attached to the back side of the lower portion of the tab support means, the lower portion of the tab support means being attached to the file folder in a generally linear fashion and wherein the upper portion of the tab support means extends above the file folder a distance which is wide enough to carry readable information.*

*6. A file tab attached to a file folder comprising:*

*tab support means, the tab support means being substantially planar and having front and back sides, a lower and upper portion and an upper edge;*

*a tab portion, wherein the tab portion is attached to the upper edge of the tab support means and is supported by the tab support means, the tab portion having a top surface, the top surface being generally perpendicular to the tab support means and the file folder, wherein a portion of the tab portion is offset from the tab support means and overhangs the tab support means so that the file tab is generally "L" shaped and wherein the tab is wide enough to carry bar code information on the top surface; and*

*securing means attached to the back side of the lower portion of the tab support means, the lower portion of the tab support means being attached to the file folder in a generally linear fashion and wherein the upper portion of the tab support means extends above the file folder a distance which is wide enough to carry readable information.*

*7. A file tab for attachment to a file folder, comprising:*

*a substantially planar support having front and back sides, a lower and upper portion and an upper edge;*

*a tab attached to the upper edge of the support, the tab having a top surface which is generally perpendicular to the support, and where a portion of the tab is offset from the support and overhangs the support so that the file tab is generally "L" shaped and wherein the tab is wide enough to carry human or machine readable information,*

*wherein the file tab is attached to the file folder which has two sides connected to form an interior of the file folder, the file tab being attached to one side of the file folder in a generally linear fashion such that the tab extends over the interior of the file folder.*

* * * * *